United States Patent
Park et al.

(10) Patent No.: US 12,219,549 B2
(45) Date of Patent: Feb. 4, 2025

(54) METHOD AND DEVICE FOR COMMUNICATION IN WIRELESS COMMUNICATION SYSTEM SUPPORTING GROUPCAST

(71) Applicant: Samsung Electronics Co., Ltd., Gyeonggi-do (KR)

(72) Inventors: Sungjin Park, Gyeonggi-do (KR); Jeongho Yeo, Gyeonggi-do (KR); Youngbum Kim, Gyeonggi-do (KR); Hyunseok Ryu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/341,355

(22) Filed: Jun. 26, 2023

(65) Prior Publication Data
US 2023/0337216 A1 Oct. 19, 2023

Related U.S. Application Data

(63) Continuation of application No. 17/507,085, filed on Oct. 21, 2021, now abandoned.

(30) Foreign Application Priority Data

Oct. 21, 2020 (KR) .......................... 10-2020-0137131

(51) Int. Cl.
*H04L 1/18* (2023.01)
*H04L 1/1812* (2023.01)
(Continued)

(52) U.S. Cl.
CPC ......... *H04W 72/121* (2013.01); *H04L 1/1819* (2013.01); *H04L 5/0053* (2013.01);
(Continued)

(58) Field of Classification Search
CPC ............. H04W 72/044; H04W 72/121; H04W 72/1263; H04W 72/1268; H04W 72/20;
(Continued)

(56) References Cited

U.S. PATENT DOCUMENTS

| 8,761,146 B2 | 6/2014 | Rinne | |
| 2017/0230962 A1* | 8/2017 | Park | H04L 1/1861 |

(Continued)

FOREIGN PATENT DOCUMENTS

| WO | WO 2019/225952 | 11/2019 | |
| WO | WO-2022082107 A1 * | 4/2022 | ........... H04L 1/1896 |

OTHER PUBLICATIONS

International Search Report dated Jan. 27, 2022 issued in counterpart application No. PCT/KR2021/014741, 6 pages.
Samsung, "Alignment CR for TS 38.213", R1-2008124, 3GPP TSG-RAN WG1 Meeting #103-e, Oct. 26-Nov. 13, 2020, 172 pages.
European Search Report dated Mar. 19, 2024 issued in counterpart application No. 21883251.7-1213, 10 pages.

*Primary Examiner* — Phuc H Tran
(74) *Attorney, Agent, or Firm* — The Farrell Law Firm, P.C.

(57) ABSTRACT

Disclosed is a method performed by a user equipment (UE) in a wireless communication system, including receiving, from a base station, downlink control information (DCI) on a physical downlink control channel (PDCCH), the DCI scheduling downlink data for the UE, receiving the downlink data on a physical downlink shared channel (PDSCH) based on the received DCI, and transmitting, to the base station, hybrid automatic repeat request acknowledgement (HARQ-ACK) information in response to the reception of the downlink data, wherein a specific PDSCH processing capability associated with the transmission of the HARQ-ACK information is not applied to the PDSCH scheduled for the UE in case that the downlink data is multicast data.

16 Claims, 13 Drawing Sheets

- Receive at least one of configuration information and scheduling information related to at least one data reception, through data channel — 901
- Identify data to be processed first or simultaneously in relation to decoding and whether resource regions for multiple data scheduled based on received information overlap — 903
- Receive identified data to be processed first or simultaneously, through data channel, and decode — 905

(51) Int. Cl.
    *H04L 5/00*         (2006.01)
    *H04W 72/044*    (2023.01)
    *H04W 72/121*    (2023.01)
    *H04W 72/1263*   (2023.01)
    *H04W 72/20*      (2023.01)

(52) U.S. Cl.
    CPC ..... *H04W 72/044* (2013.01); *H04W 72/1263* (2013.01); *H04W 72/20* (2023.01)

(58) Field of Classification Search
    CPC .............. H04W 72/569; H04L 1/1819; H04L 5/0053; H04L 1/1854; H04L 2001/0093; H04L 5/0091
    See application file for complete search history.

(56) References Cited

U.S. PATENT DOCUMENTS

| | | | |
|---|---|---|---|
| 2018/0019844 A1* | 1/2018 | Nogami | H04L 5/0055 |
| 2018/0042015 A1* | 2/2018 | Yin | H04W 72/23 |
| 2018/0288785 A1 | 10/2018 | Guo et al. | |
| 2019/0132104 A1 | 5/2019 | Leo et al. | |
| 2020/0275248 A1 | 8/2020 | Agiwal et al. | |
| 2021/0021321 A1* | 1/2021 | Liu | H04B 7/088 |
| 2021/0037484 A1* | 2/2021 | Zhou | H04W 52/325 |
| 2021/0211228 A1 | 7/2021 | Lee et al. | |
| 2022/0104212 A1 | 3/2022 | Xu | |
| 2022/0124711 A1 | 4/2022 | Zhou | |

\* cited by examiner

METHOD AND DEVICE FOR COMMUNICATION IN WIRELESS COMMUNICATION SYSTEM SUPPORTING GROUPCAST

CROSS-REFERENCE TO RELATED APPLICATION(S)

This application is a Continuation application of U.S. patent application Ser. No. 17/507,085, filed Oct. 21, 2021, and based on and claims priority under 35 U.S.C. § 119 to Korean Patent Application No. 10-2020-0137131, filed on Oct. 21, 2020, in the Korean Intellectual Property Office, the disclosure of which is incorporated herein by reference in its entirety.

BACKGROUND

1. Field

The disclosure relates generally to a wireless communication system, and more particularly, to a method and device for communication in a wireless communication system supporting groupcast.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In a wireless communication system, a base station may transmit the same data to a plurality of UEs to provide a groupcast service. In this case, if a groupcast service is provided to each UE through separate data transmission/reception, communication resource inefficiency may result. Accordingly, a need exists for providing a communication method and device for efficiently performing data transmission/reception in a wireless communication system supporting a groupcast service.

SUMMARY

The disclosure has been made to address at least the above-mentioned problems and/or disadvantages and to provide at least the advantages described below.

Accordingly, an aspect of the disclosure is to provide an efficient communication method and device in a wireless communication system supporting groupcast.

Another aspect of the disclosure is to provide a method and device for transmitting/receiving hybrid automatic repeat request (HARQ) feedback information for groupcast data in a wireless communication system.

Another aspect of the disclosure is to provide a signal transmission/reception method and device considering the relationship between data for groupcast and/or multicast and data for unicast and/or broadcast in a wireless communication system.

Another aspect of the disclosure is to provide a method and device for transmitting/receiving HARQ feedback information and processing data of a UE when data for groupcast and/or multicast and data for unicast and/or broadcast are received together in a wireless communication system.

Another aspect of the disclosure is to provide a method and device for receiving data for groupcast and/or multicast by a UE receiving data for groupcast and/or multicast, according to the UE's capability.

According to an aspect of the disclosure, a method performed by a user equipment (UE) in a wireless communication system includes receiving, from a base station, downlink control information (DCI) on a physical downlink control channel (PDCCH), the DCI scheduling downlink data for the UE, receiving the downlink data on a physical downlink shared channel (PDSCH) based on the received DCI, and transmitting, to the base station, hybrid automatic repeat request acknowledgement (HARQ-ACK) information in response to the reception of the downlink data, wherein a specific PDSCH processing capability associated with the transmission of the HARQ-ACK information is not applied to the PDSCH scheduled for the UE in case that the downlink data is multicast data.

According to another aspect of the disclosure, a UE in a wireless communication system includes a transceiver, and a processor configured to receive, via the transceiver from a base station, DCI on a PDCCH, the DCI scheduling downlink data for the UE, receive the downlink data on a PDSCH based on the received DCI, and transmit, to the base station via the transceiver, HARQ-ACK information in response to the reception of the downlink data, wherein a specific PDSCH processing capability associated with the transmission of the HARQ-ACK information is not applied to the PDSCH scheduled for the UE in case that the downlink data is multicast data.

According to another aspect of the disclosure, a method performed by a base station in a wireless communication system includes transmitting, to a UE, DCI on a PDCCH, the DCI scheduling downlink data for the UE, transmitting the downlink data on a PDSCH based on the transmitted DCI, and receiving, from the UE, HARQ-ACK information in response to the transmission of the downlink data, wherein a specific PDSCH processing capability associated with the reception of the HARQ-ACK information is not applied to the PDSCH scheduled for the UE in case that the downlink data is multicast data.

According to another aspect of the disclosure, a base station in a wireless communication system includes a transceiver, and a processor configured to transmit, to a UE, DCI on a PDCCH, the DCI scheduling downlink data for the UE, transmit the downlink data on a PDSCH based on the transmitted DCI, and receive, from the UE, HARQ-ACK information in response to the transmission of the downlink data, wherein a specific PDSCH processing capability associated with the reception of the HARQ-ACK information is not applied to the PDSCH scheduled for the UE in case that the downlink data is multicast data.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
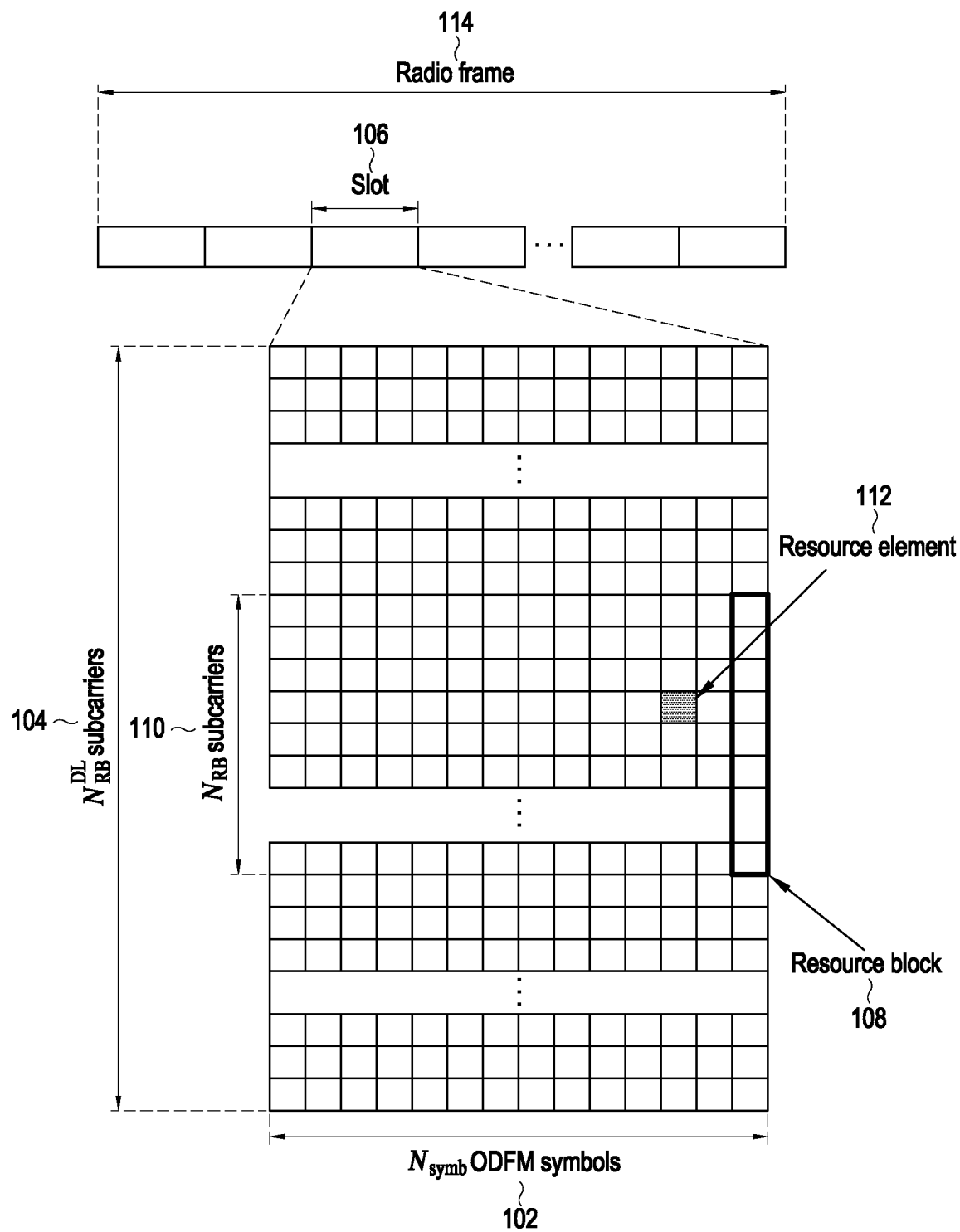
FIG. 1 illustrates a downlink or uplink time-frequency domain transmission structure of a 5G system, to which the disclosure is applied.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

Some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure.

As used herein, the term "unit" refers to a software element or a hardware element such as a field-programmable gate array (FPGA) or an application specific integrated circuit (ASIC). A unit plays a certain role. However, the term unit is not limited as meaning a software or hardware element. A 'unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. An element or a unit may be implemented to reproduce one or more central processing units (CPUs) in a device or a security multimedia card. A unit may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), 3GPP2 high rate packet data (HRPD), ultra-mobile broadband (UMB), and institute of electrical and electronics engineers (IEEE) 802.16e communication standards. For 5G wireless communication systems, 5G or NR communication is being standardized.

As a representative broadband wireless communication system, the NR system adopts OFDM for downlink (DL) and uplink (UL). More specifically, the NR system employs cyclic-prefix OFDM (CP-OFDM) for downlink and two schemes, i.e., CP-OFDM and discrete Fourier transform spreading OFDM (DFT-S-OFDM) for the UL, which indicates a wireless link where the UE (or mobile station (MS)) transmits data or control signals to the base station (BS, gNode B, or gNB), and download means a wireless link where the base station transmits data or control signals to the UE.

Such multiple access scheme allocates and operates time-frequency resources carrying data or control information per user not to overlap, i.e., to maintain orthogonality, to thereby differentiate each user's data or control information.

The description of embodiments of the disclosure focuses on the radio access network (RAN), new RAN (NR), and the core network, packet core (5G system, or 5G core network, or NG core, or next generation core), which are specified by the 3rd generation partnership (3GPP) which is a standardization organization. However, the subject matter of the disclosure, or slight changes thereto, may also be applicable to 5G or post-5G systems or other communication systems that share similar technical backgrounds without departing from the scope of the disclosure, which would readily be appreciated by one of ordinary skill in the art.

For ease of description, some of the terms or names defined in the 3GPP standards for 5G and NR, long-term evolution (LTE), or similar systems may be used. However, the disclosure is not limited by such terms and names and may be likewise applicable to systems conforming to other standards. As used herein, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concepts.

The NR system adopts the HARQ scheme that re-transmits corresponding data through the physical layer in case decoding fails at the initial stage of transmission. By the HARQ scheme, if the receiver fails to precisely decode data, the receiver transmits information (negative acknowledgement (NACK)) indicating the decoding failure to the transmitter so that the transmitter may re-transmit the corresponding data through the physical layer. The receiver raises the data reception capability by combining the data re-transmitted by the transmitter with the data for which decoding has failed before. When the receiver precisely decodes data, the receiver may transmit information (acknowledgment (ACK)) indicating decoding succeeds to the transmitter so that the transmitter may transmit new data.

Herein, the instance when one UE transmits the same data to a plurality of UEs or when a base station transmits the same data to a plurality of UEs is referred to as groupcast or multicast. The terms groupcast and multicast may be interchangeably used and may be collectively referred to as groupcast.

The term "base station (BS)" may refer to any component (or a set of components) configured to provide wireless access, such as a transmission point (TP), a transmit-receive point (TRP), an enhanced node B (eNodeB or eNB), a 5G base station (gNB), a macrocell, a femtocell, Wi-Fi access point (AP), or other wireless-enabled devices, based on the type of the wireless communication system. The base station may be a network entity including at least one of an integrated access and backhaul-donor (IAB-donor), which is a gNB providing network access to UEs through a network of backhaul and access links in the NR system, and an IAB-node, which is a RAN node supporting NR backhaul links to the IAB-donor or another IAB-node and supporting NR access links to UEs. The UE is wirelessly connected through the IAB-node and may transmit/receive data to and from the IAB-donor connected with at least one IAB-node through the backhaul link. Base stations may provide wireless access according to one or more radio protocols, e.g., 5G 3GPP new radio interface/access (NR), long-term evolution (LTE), LTE advanced (LTE-A), high-speed packet access (HSPA), or Wi-Fi 802.11a/b/g/n/ac.

Herein, the term UE may refer to any component, such as a mobile station, subscriber station, remote terminal, wireless terminal, receive point, or user device. For convenience, the term UE is used to refer to a device that accesses a base station regardless of whether it needs to be considered as a mobile device (such as a mobile phone or a smart phone) or a stationary device (such as a desktop computer or vending machine).

FIG. 1 illustrates a basic structure of a time-frequency domain which is a radio resource domain where the data or control channel is transmitted on the DL or UL in the NR system, to which the disclosure is applied.

In FIG. 1, the horizontal axis denotes the time domain, and the vertical axis denotes the frequency domain. The minimum transmission unit in the time domain is the OFDM symbol, and Nsymb (102) OFDM symbols together form one slot 106. The length of the subframe is defined as 1.0 ms, and the radio frame 114 is defined as 10 ms. In the frequency domain, the minimum transmission unit is a subcarrier, and the bandwidth of the overall system transmission band may consist of a total of $N^{DL}_{RB}$ (104) subcarriers. One frame may be defined as 10 ms. One subframe may be defined as 1 ms, and thus, one frame may consist of a total of 10 subframes. One slot may be defined as 14 OFDM symbols (that is, the number ($N_{symb}^{slot}$) of symbols per slot=14). One subframe may be composed of one or more slots, and the number of the slots included in one subframe may vary according to μ which is a value set for subcarrier spacing. When μ=0, one subframe may consist of one slot, and when μ=1, one subframe may consist of two slots. In other words, according to the set subcarrier spacing value μ, the number ($N_{slot}^{subframe,\mu}$) of slots per subframe may vary, and accordingly, the number ($N_{slot}^{frame,\mu}$) of slots per frame may differ. According to each subcarrier spacing μ, $N_{slot}^{subframe,\mu}$ and $N_{slot}^{frame,\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 1 | 14 | 20 | 2 |
| 2 | 14 | 40 | 4 |
| 3 | 14 | 80 | 8 |
| 4 | 14 | 160 | 16 |

Before a radio resource control (RRC) connection of the UE is established, the UE may be configured with an initial bandwidth part (BWP) for initial access by the base station via a master information block (MIB). More specifically, the UE may receive configuration information for a search space and control resource set (CORESET) in which a physical DL control channel (PDCCH) may be transmitted to receive system information (remaining system information, remaining minimum system information (RMSI) or system information block 1 (SIB1)) necessary for initial access through the MIB in the initial access phase. Each of the control resource set and a search space configured through the MIB may be regarded as an identifier (or identity (ID) 0. The control resource set and the search space configured through the MIB may be a common control resource set and a common search space, respectively. The base station may provide the UE with configuration information, such as frequency allocation information, time allocation information, and numerology for control resource set #0, via the MIB. The base station may provide the UE with configuration information for paging occasion and monitoring period for control resource set #0, i.e., configuration information for search space #0, via the MIB. The UE may regard the frequency range set as control resource set #0 obtained from the MIB, as the initial BWP for initial access. In this case, the ID of the initial BWP may be regarded as 0. The MIB may include such information as those in Table 2A and Table 2B below.

TABLE 2A

```
-- ASN1START
-- TAG-MIB-START
MIB ::=                      SEQUENCE {
    systemFrameNumber            BIT STRING (SIZE (6)),
    subCarrierSpacingCommon      ENUMERATED {scs15or60,
                                    scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed, notAllowed},
    spare                        BIT STRING (SIZE (1))
}
-- TAG-MIB-STOP
-- ASN1STOP
```

In a method for configuring a BWP, UEs before RRC connected mode may receive configuration information for the initial BWP via MIB in the initial access phase. Specifically, the UE may be configured with a control resource set for a PDCCH where DL control information (DCI) for scheduling SIB may be transmitted from the MIB of the physical broadcast channel (PBCH). In this case, the bandwidth of the control resource set configured by the MIB may be regarded as the initial BWP, and the UE may receive the physical DL shared channel (PDSCH), which transmits the SIB, via the configured initial BWP. The initial BWP may be utilized for other system information (OSI), paging, and random access as well as for receiving the SIB.

If the UE is configured with one or more bandwidth parts, the base station may instruct the UE to change the bandwidth part using the bandwidth part indicator field in the DCI.

The basic resource units in the time-frequency domains are the resource elements (REs) 112 of FIG. 1 and may be represented with the OFDM symbol index and the subcarrier index. The resource block (RB) 108 or physical resource block (PRB) is defined as $N_{RB}$ (110) contiguous subcarriers in the frequency domain. Generally, the minimum transmission unit of data is the RB. Generally, in the NR system, Nsymb=14, $N_{RB}$=12, and $N^{DL}_{RB}$ (104) is proportional to the bandwidth of system transmission band. Data rate may increase in proportion to the number of RBs scheduled for the UE.

In the NR system, for the frequency division duplex (FDD) system differentiating and operating DL and UL with frequencies, DL transmission bandwidth may differ from UL transmission bandwidth. The channel bandwidth refers to an RF bandwidth corresponding to the system transmission bandwidth. Tables 3 and 4 below show some system trans-

TABLE 2B

MIB field descriptions
cellBarred
Value barred means that the cell is barred, as defined in TS 38.304 [20].
dmrs-TypeA-Position
Position of (first) DM-RS for downlink (see TS 38.211 [16], clause 7.4.1.1.2) and uplink
(see TS 38.211 [16], clause 6.4.1.1.3).
intraFreqReselection
Controls cell selection/reselection to intra-frequency cells when the highest ranked
cell is barred, or treated as barred by the UE, as specified in TS 38.304 [20].
pdcch-ConfigSIB1
Determines a common ControlResourceSet (CORESET), a common search space and
necessary PDCCH parameters. If the field ssb-SubcarrierOffset indicates that SIB1 is
absent, the field pdcch-ConfigSIB1 indicates the frequency positions where the UE
may find SS/PBCH block with SIB1 or the frequency range where the network does
not provide SS/PBCH block with SIB1 (see TS 38.213 [13], clause 13).
ssb-SubcarrierOffset
Corresponds to kSSB (see TS 38.213 [13]), which is the frequency domain offset
between SSB and the overall resource block grid in number of subcarriers. (See TS
38.211 [16], clause 7.4.3.1).
The value range of this field may be extended by an additional most significant bit
encoded within PBCH as specified in TS 38.213 [13].
This field may indicate that this cell does not provide SIB1 and that there is hence no
CORESET#0 configured in MIB (see TS 38.213 [13], clause 13). In this case, the field
pdcch-ConfigSIBI may indicate the frequency positions where the UE may (not) find
a SS/PBCH with a control resource set and search space for SIB1 (see TS 38.213 [13],
clause 13).
subCarrierSpacingCommon
Subcarrier spacing for SIB1, Msg.2/4 for initial access, paging and broadcast SI-
messages. If the UE acquires this MIB on an FR1 carrier frequency, the value
scs15or60 corresponds to 15 kHz and the value scs30or120 corresponds to 30 kHz. If
the UE acquires this MIB on an FR2 carrier frequency, the value scs15or60
corresponds to 60 kHz and the value scs30or120 corresponds to 120 kHz.
systemFrameNumber
The 6 most significant bits (MSB) of the 10-bit System Frame Number (SFN). The 4
LSB of the SFN are conveyed in the PBCH transport block as part of channel coding
(i.e. outside the MIB encoding), as defined in clause 7.1 in TS 38.212 [17].

mission bandwidths and the relationship between subcarrier spacing and channel bandwidth defined in NR system, for frequency bands lower than 6 GHz and higher than 6 GHz, respectively. For example, in an NR system with a channel bandwidth of 100 MHz and a subcarrier spacing of 30 kHz, the transmission bandwidth may be composed of 273 RBs. In the following, N/A may be a bandwidth-subcarrier combination not supported by the NR system. Table 3 below shows the configuration of frequency range 1 (FR1), and Table 4 below shows the configuration of frequency range 2 (FR2).

TABLE 3

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 4

| | subcarrier spacing | Channel bandwidth BWChannel [MHz] | | | |
|---|---|---|---|---|---|
| | | 50 MHz | 100 MHz | 200 MHz | 400 MHz |
| Transmission bandwidth configuration NRB | 60 kHz | 66 | 132 | 264 | N/A |
| | 120 kHz | 32 | 66 | 132 | 264 |

In the NR system, the frequency range may be defined separately for FR1 and FR2 as in Table 5 below.

TABLE 5

| Frequency range designation | Corresponding frequency range |
|---|---|
| FR1 | 450 MHz-7125 MHz |
| FR2 | 24250 MHz-52600 MHz |

In Table 5, the ranges of FR1 and FR2 may be changed and applied. For example, the frequency range of FR1 may be changed from 450 MHz up to 6000 MHz.

The synchronization signal (SS)/PBCH block, also referred to as an SSB, refers to a physical layer channel block composed of a primary SS (PSS), secondary SS (SSS), and physical broadcast channel (PBCH). Details are as follows.

PSS: A signal that serves as a reference for DL time/frequency synchronization and provides part of the information for cell ID SSS: serves as a reference for DL time/frequency synchronization and provides the rest of the information for cell ID, which PSS does not provide. Additionally, it may serve as a reference signal for demodulation of PBCH.

PBCH: provides essential system information necessary for transmitting and receiving the data channel and control channel by the UE. The essential system information may include search space-related control information indicating radio resource mapping information for a control channel and scheduling control information for a separate data channel for transmitting system information.

SS/PBCH block: A block composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control resource set #0 (which may correspond to a control resource set having a control resource set index of 0). The UE may perform monitoring on control resource set #0, assuming the selected SS/PBCH block and the demodulation reference signal (DMRS) transmitted in control resource set #0 are quasi-co-located (QCLed). The UE may receive system information through the DL control information transmitted in control resource set #0. The UE may obtain configuration information related to random access channel (RACH) required for initial access from the received system information. The UE may transmit the physical RACH (PRACH) to the base station considering the selected SS/PBCH index, and the base station receiving the PRACH may obtain information for the SS/PBCH block index selected by the UE. Through this process, the base station knows which block the UE has selected from the SS/PBCH blocks and monitors control resource set #0 related thereto.

DLDCI in the 5G system is described as follows.

Scheduling information for UL data (or physical UL shared channel (PUSCH) or DL data (or physical DL data channel (PDSCH) in the 5G system is transmitted from the base station through DCI to the UE. The UE may monitor the DCI format for fallback and the DCI format for non-fallback for the PUSCH or the PDSCH. The fallback DCI format may be composed of fixed fields predefined between the base station and the UE, and the non-fallback DCI format may include configurable fields. The DCI may include other various formats, and it may be known whether the DCI is for power control or for a slot format indicator (SFI) depending on the format.

DCI may be transmitted through the PDCCH via channel coding and modulation. A CRC is added to the DCI message payload, and the CRC is scrambled with the radio network temporary identifier (RNTI) that is the identification information for the UE. Different RNTIs may be used for the purposes of the DCI message, e.g., UE-specific data transmission, power control command, or random access response. In other words, the RNTI is not explicitly transmitted, but the RNTI is included in the CRC calculation process and transmitted. Upon receiving the DCI transmitted on the PDCCH, the UE identifies the CRC using the allocated RNTI, and when the CRC is correct, the UE may be aware that the DCI has been transmitted to the UE. The PDCCH is mapped and transmitted in a control resource set (CORESET) configured in the UE.

For example, DCI scheduling a PDSCH transferring system information (SI) may be scrambled to system information-RNTI (SI-RNTI). DCI scheduling a PDSCH transferring a random access response (RAR) message may be scrambled to random access-RNTI (RA-RNTI). DCI scheduling a PDSCH transferring a paging message may be scrambled with paging-RNTI (P-RNTI). DCI providing an SFI may be scrambled to SFI-RNTI. DCI providing transmit power control (TPC) may be scrambled to TPC-RNTI. DCI for scheduling a UE-specific PDSCH or PUSCH may be scrambled with cell RNTI (C-RNTI). The scramble of the RNTI value to the DCI may indicate that the RNTI value is added to the CRC bit added to the DCI by an XOR operation (0+0=0, 1+0=1, 1+1=0). The XOR operation may be a modulo-2 operation. If the number of bits of CRC of DCI is different from the number of bits of RNTI, an operation may be performed with the least significant bit (LSB) or most significant bit (MSB) of the one with more bits. For example, when the CRC of DCI has 24 bits and the RNTI has 16 bits, the RNTI may be scrambled to the LSB 16 bits of the CRC.

DCI format 0_0 may be used as fallback DCI for scheduling the PUSCH. In this case, CRC may be scrambled to C-RNTI. DCI format 0_0 in which CRC is scrambled to C-RNTI may include, e.g., the information shown in Table 6 below.

TABLE 6

Identifier for DCI formats - [1] bit
Frequency domain resource assignment - $\lceil \log_2(N_{RB}^{UL, BWP} (N_{RB}^{UL, BWP} + 1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC(transmit power control) command for scheduled PUSCH - [2] bits
UL/SUL(supplementary UL) indicator - 0 or 1 bit DCI format 0_1 may be used as non-fallback DCI for scheduling the PUSCH. In this case, CRC may be scrambled to C-RNTI. DCI format 0_1 in which CRC is scrambled to C-RNTI may include, e.g., the information shown in Table 7 below.

TABLE 7

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2 (N_{RB}^{UL,BWP}(N_{RB}^{UL,BWP} + 1)/2) \rceil$ bits
Time domain resource assignment - 1, 2, 3, or 4 bits
VRB(virtual resource block)-to-PRB(physical resource block) mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non-codebook based PUSCH transmission;

$\lceil \log_2(N_{SRS}) \rceil$ bits for codebook based PUSCH transmission.

Precoding information and number of layers - up to 6 bits
Antenna ports - up to 5 bits
SRS request - 2 bits
CSI request - 0, 1, 2, 3, 4, 5, or 6 bits
CBG(code block group) transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI for scheduling the PDSCH. In this case, CRC may be scrambled to C-RNTI. DCI format 1_0 in which CRC is scrambled to C-RNTI may include, e.g., the information shown in Table 8 below.

TABLE 8

Identifier for DCI formats - [1] bit
Frequency domain resource assignment -$[\lceil \log_2(N_{RB}^{DL,\ BWP}(N_{RB}^{DL,\ BWP} + 1)/2)\rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH(physical uplink control channel) resource indicator - 3 bits
PDSCH-to-HARQ feedback timing indicator - [3] bits DCI format 1_1 may be used as non-fallback DCI for scheduling the PDSCH. In this case, CRC may be scrambled to C-RNTI. DCI format 1_1 in which CRC is scrambled to C-RNTI may include, e.g., the information shown in Table 9 below.

TABLE 9

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,\ BWP}/P \rceil$ bits
    For resource allocation type 1, $\lceil \log_2(N_{RB}^{DL,\ BWP}(N_{RB}^{DL,\ BWP} + 1)/2) \rceil$ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1:

TABLE 9-continued

Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG(code block qroup) transmission information - 0, 2, 4, 6, or 8 bits
CBG flushing out information - 0 or 1 bit
DMRS sequence initialization - 1 bit The following describes a method for allocating time domain resources for a data channel in a 5G communication system.

The base station may configure the UE with a table for time domain resource allocation (TDRA) information for the PDSCH and the PUSCH using higher layer signaling (e.g., RRC signaling). For the PDSCH, a table including up to maxNrofDL-Allocations=16 entries may be configured, and for the PUSCH, a table including up to maxNrofUL-Allocations=16 entries may be configured. The time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Tables 10 and 11 below may be provided from the base station to the UE.

TABLE 10

PDSCH-TimeDomainResourceAllocationList information element
PDSCH-TimeDomainResourceAllocationList ::=  SEQUENCE (SIZE(1..maxNrofDL-Allocations)) OF PDSCH-TimeDomainResourceAllocation
PDSCH-TimeDomainResourceAllocation ::=  SEQUENCE {
  k0                                INTEGER(0..32)
OPTIONAL, -- Need S
  (PDCCH-to-PDSCH Timing, slot unit)
mappingType                         ENUMERATED {typeA, typeB},
  (PDSCH Mapping type)
startSymbolAndLength                INTEGER (0..127)
  (Start symbol and length of PDSCH)
}

TABLE 11

PUSCH-TimeDomainResourceAllocation information element
PUSCH-TimeDomainResourceAllocationList ::=  SEQUENCE (SIZE(1..maxNrofUL-Allocations)) OF PUSCH-TimeDomainResourceAllocation
PUSCH-TimeDomainResourceAllocation ::=  SEQUENCE {
  k2                                INTEGER(0..32)    OPTIONAL,
-- Need S
  (PDCCH-to-PUSCH Timing, slot unit)
mappingType                         ENUMERATED {typeA, typeB},
  (PUSCH Mapping type)

TABLE 11-continued

| startSymbolAndLength (Start symbol and length of PUSCH) | INTEGER (0..127) |
|---|---|
| } | |

The base station may provide the UE with one of the entries in the table for the time domain resource allocation information via L1 signaling (e.g., DCI) (e.g., it may be indicated with a time domain resource allocation field in the DCI). The UE may obtain time domain resource allocation information for the PDSCH or PUSCH based on the DCI received from the base station. Among the control information below, SCI is control information transferred through a physical sidelink control channel (PSCCH) between UEs in sidelink communication and may include scheduling information.

In the disclosure, higher layer signaling may correspond to at least one or a combination of one or more of the following signalings: MIB, SIB, RRC, medium access control (MAC) control element (CE), UE capability reporting, and UE assistance information message.

Herein, L1 signaling may correspond to at least one or a combination of one or more of the following physical layer channels or signaling methods:
  PDCCH, DCI, UE specific DCI, group common DCI, common DCI,
  scheduling DCI (e.g., DCI used for scheduling DL or UL data), non-scheduling DCI (e.g., DCI not for the purpose of scheduling DL or UL data), PUCCH, UCI, PSCCH, and SCI.

Figure 2:
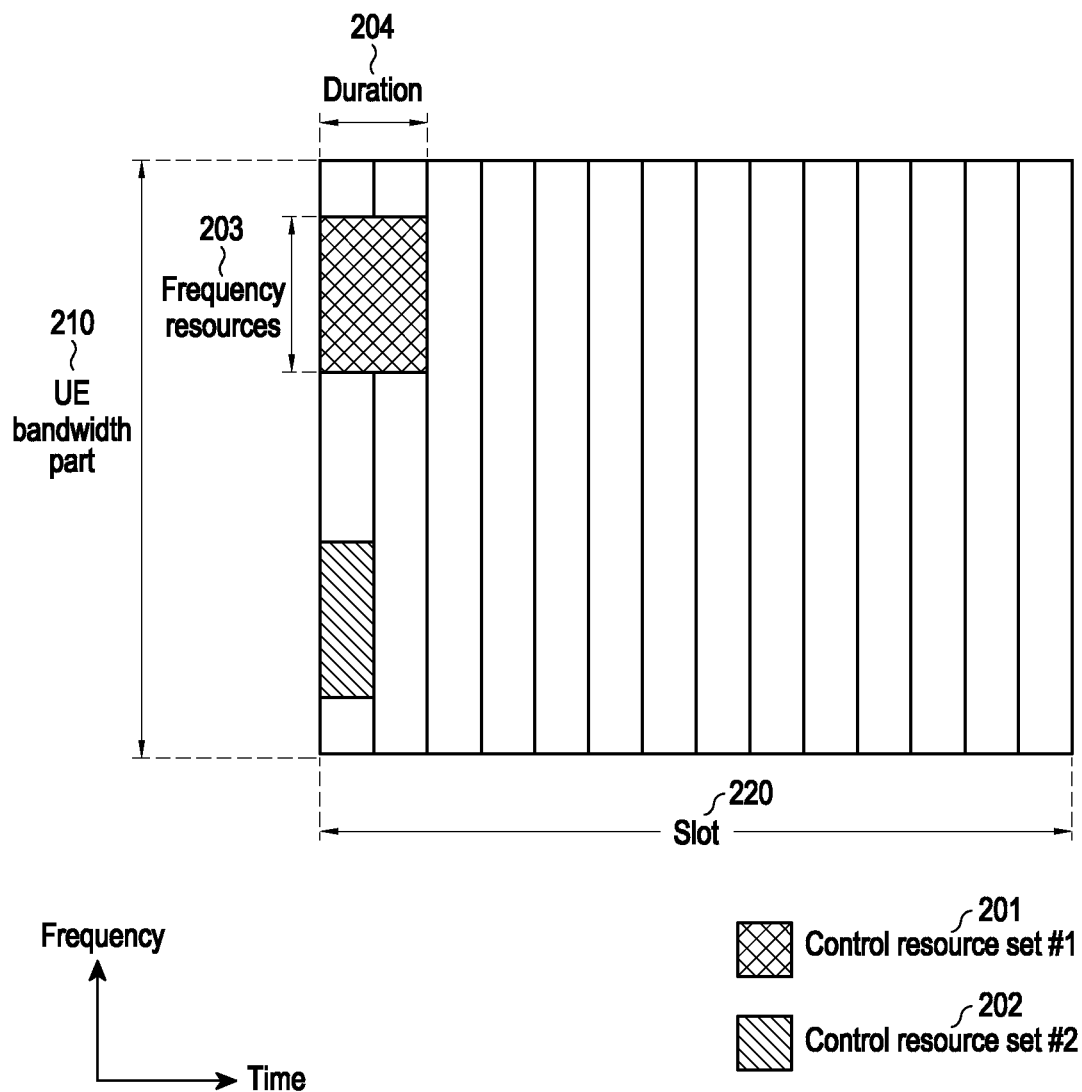
FIG. 2 illustrates an example in which eMBB, URLLC, and mMTC data are allocated in frequency-time resources in a communication system, to which the disclosure is applied.

FIG. 2 illustrates an example of a control resource set (CORESET) where the download control channel is transmitted in the 5G wireless communication system, to which the disclosure is applied.

FIG. 2 illustrates an example in which two control resource sets (control resource set #1 201 and control resource set #2 202) are configured in one slot 220 on the time axis, and a UE bandwidth part 210 is configured on the frequency axis. The control resource sets may be configured in specific frequency resources of the bandwidth part 210 of the UE on the frequency axis. FIG. 2 illustrates that the specific frequency resource 203 is an example of a frequency resource configured in control resource set #1 201. The control resource set may be configured with one or more OFDM symbols on the time axis, which may be defined as control resource set duration 204. In the example of FIG. 2, control resource set #1 201 is configured as a length of two symbols, and control resource set #2 202 is configured as a length of one symbol.

The above-described 5G control resource set may be configured via higher layer signaling (e.g., system information, MIB, or RRC signaling) or DCI from the base station to the UE. Configuring a UE with a control resource set refers to providing the UE with such information as the identifier of the control resource set, the frequency position of the control resource set, and symbol length of the control resource set. Configuration information for the control resource set may include, e.g., information shown in Table 12 below.

TABLE 12

| ControlResourceSet ::= | SEQUENCE { |
|---|---|
| -- Corresponds to L1 parameter 'CORESET-ID' | |
| control ResourceSetId | Control ResourceSetId, |

TABLE 12-continued

| (Control resource set identity) | |
|---|---|
| frequencyDomainResources | BIT STRING (SIZE (45)), |
| (Frequency domain resource allocation information) | |
| duration | INTEGER (1..maxCoReSetDuration), |
| (Time domain resource allocation information) | |
| cce-REG-MappingType | CHOICE { |
| (CCE-to-REG Mapping scheme) | |
| interleaved | SEQUENCE { |
| reg-BundleSize | ENUMERATED {n2, n3, n6}, |
| (REG Bundle size) | |
| precoderGranularity | ENUMERATED {sameAsREG-bundle, allContiguousRBs}, |
| interleaverSize | ENUMERATED {n2, n3, n6} |
| (Interleaver size) | |
| shiftIndex | |
| INTEGER(0..maxNrofPhysicalResourceBlocks-1) OPTIONAL | |
| (Interleaver shift) | |
| }, | |
| nonInterleaved | NULL |
| }, | |
| tci-StatesPDCCH | SEQUENCE(SIZE (1..maxNrofTCI-StatesPDCCH)) OF TCI-StateId OPTIONAL, |
| (QCL Configuration information) | |
| tci-PresentInDCI | ENUMERATED {enabled} |
| } | |

In Table 12, transmission configuration indication (TCI) state PDCCH configuration information may include information for one or more SS/PBCH block indexes quasi co-located (QCLed) with the DMRS transmitted in a corresponding control resource set or channel state information reference signal (CSI-RS) index information.

For example, each piece of control information included in DCI format 1_1 that is scheduling control information (DL grant) for DL data may be as follows:
  Carrier indicator: indicates which carrier the data scheduled by DCI is transmitted on—0 or 3 bits
  Identifier for DCI formats: indicates the DCI format for identifying whether the corresponding DCI is for DL or UL.—[1] bits
  Bandwidth part indicator: indicates a change in bandwidth part, if any.—0, 1 or 2 bits
  Frequency domain resource assignment: Resource allocation information indicating frequency domain resource allocation. The resource expressed varies depending on whether the resource allocation type is 0 or 1.
  Time domain resource assignment: Resource allocation information indicating time domain resource allocation. This may indicate one configuration of a predefined PDSCH time domain resource allocation list or higher layer signaling—1, 2, 3, or 4 bits
  VRB-to-PRB mapping: indicates a mapping relationship between the virtual resource block (VRB) and the PRB—0 or 1 bit
  PRB bundling size indicator: indicates the size of physical resource block bundling assuming that the same precoding is applied—0 or 1 bit
  Rate matching indicator: indicates which rate match group is applied among the rate match groups configured via a higher layer applied to PDSCH—0, 1, or 2 bits ZP CSI-RS trigger: triggers the zero power channel state information reference signal—0, 1, or 2 bits Transport block (TB)-related configuration information: indicates modulation and coding scheme (MCS), new data indicator (NDI) and redundancy version (RV) for one or two TBs.

Modulation and coding scheme (MCS): indicates the coding rate and modulation scheme used for data transmission. In other words, this may indicate the coding rate value that may indicate TB size (TBS) and channel coding information along with information for whether it is QPSK, 16QAM, 64QAM, or 256QAM.

New data indicator: indicates whether HARQ initial transmission or re-transmission.

RV: indicates the redundancy version of HARQ.

HARQ process number: indicates HARQ process number applied to PDSCH—4 bits

DL assignment index: An index for generating a dynamic HARQ-ACK codebook when reporting HARQ-ACK for PDSCH—0 or 2 or 4 bits TPC command for scheduled PUCCH: Power control information applied to PUCCH for HARQ-ACK report for PDSCH—2 bits PUCCH resource indicator: Information indicating the resource of PUCCH for HARQ-ACK report for PDSCH—3 bits PDSCH-to-HARQ feedback timing indicator: Configuration information for the slot in which PUCCH for HARQ-ACK report for PDSCH is transmitted—3 bits Antenna ports: Information indicating the antenna port of the PDSCH DMRS and the DMRS CDM group in which the PDSCH is not transmitted—4, 5 or 6 bits TCI: Information indicating beam-related information for PDSCH—0 or 3 bits SRS request: Information requesting SRS transmission—2 bits Code block group (CBG) transmission information: Information indicating which CBG of data is transmitted through PDSCH when code block group-based retransmission is configured—0, 2, 4, 6, or 8 bits CBG flushing out information: Information indicating whether the code block group previously received by the UE may be used for HARQ combining—0 or 1 bit DMRS sequence initialization: indicates DMRS sequence initialization parameter—1 bit In the case of data transmission through a PDSCH or a PUSCH, time domain resource assignment (TDRA) may be transferred by information for a slot in which a PDSCH/PUSCH is transmitted and the number L of symbols in which the PDSCH/PUSCH is mapped with the start symbol position S in the slot. S may be a relative position from the start of the slot, L may be the number of contiguous symbols, and S and L may be determined from a start and length indicator value (SLIV) defined as in Equation (1) below.

$$\begin{aligned}&\text{if } (L-1) \le 7 \text{ then} \\ &\quad SLIV = 14 \cdot (L-1) + S \\ &\text{else} \\ &\quad SLIV = 14 \cdot (14 - L + 1) + (14 - 1 - S) \\ &\text{where } 0 < L \le 14 - S\end{aligned} \quad \ldots(1)$$

In the NR system, the UE may be configured with information for the slot in which the PDSCH/PUSCH is transmitted and a PDSCH/PUSCH mapping type and SLIV value in one row via RRC configuration (e.g., the information may be configured in the form of a table). Thereafter, in the time domain resource allocation of the DCI, the base station may transfer, to the UE, the SLIV value, a PDSCH/PUSCH mapping type, and information for the slot in which the PDSCH/PUSCH is transmitted by indicating the index value in the configured table.

In the NR system, type A and type B may be defined as PDSCH mapping types. In PDSCH mapping type A, the first symbol among DMRS symbols may be located in the second or third OFDM symbol of the slot. In PDSCH mapping type B, the first symbol among DMRS symbols of the first OFDM symbol in the time domain resource allocated by PUSCH transmission may be located.

DL data may be transmitted on the PDSCH, which may be transmitted after the control channel transmission period, and the specific mapping position in the frequency domain, modulation scheme, or other scheduling information are determined based on the DCI transmitted through the PDCCH.

Through the MCS among the control information constituting the DCI, the base station notifies the UE of the modulation scheme that has applied to the PDSCH to be transmitted and the size of data to be transmitted (TBS). Herein, the MCS may be composed of 5 bits or greater than or less than 5 bits. The TBS corresponds to the size before applying channel coding for error correction to the data to be transmitted by the base station.

In the disclosure, a TB may include a MAC header, a MAC control element, one or more MAC service data units (SDUs), and padding bits. Alternatively, TB may denote a unit of data delivered from the MAC layer to the physical layer or a MAC protocol data unit (PDU).

The NR system supports the following modulation schemes: quadrature phase shift keying (QPSK), 16 quadrature amplitude modulation (16QAM), 64QAM, and 256 QAM, and their respective modulation orders (Qm) are 2, 4, 6, and 8. In other words, QPSK, 16QAM, 64QAM, and 256QAM may transmit 2 bits per symbol, 4 bits per symbol, 6 bits per symbol, and 8 bits per symbol, respectively.

Figure 3:
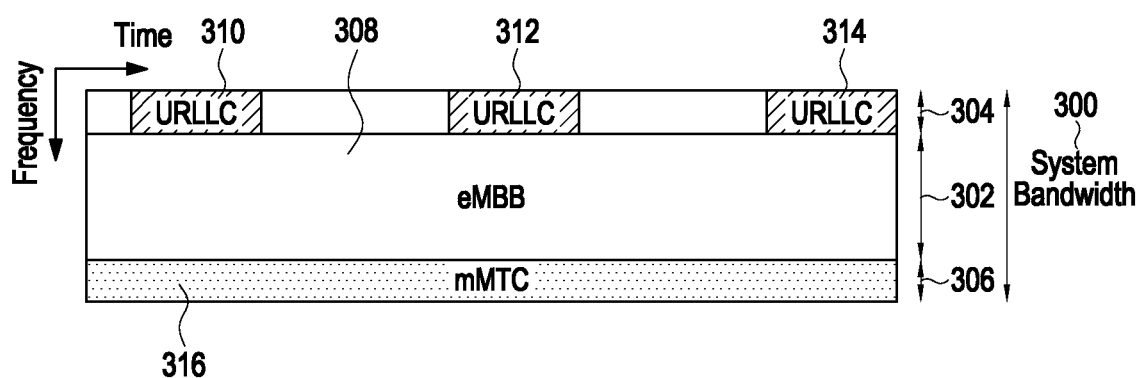
FIG. 3 illustrates another example in which eMBB, URLLC, and mMTC data are allocated in frequency-time resources in a communication system, to which the disclosure is applied.

FIG. 3 illustrates an example in which data of eMBB, URLLC, and mMTC data, which are services considered in 5G or NR systems, are allocated in frequency-time resources, to which the disclosure is applied.

Referring to FIG. 3, it may be identified how frequency and time resources are allocated for information transmission in each system.

FIG. 3 illustrates an example in which data for eMBB, URLLC, and mMTC are allocated in the entire system frequency band 300. If URLLC data 310, 312, and 314 needs to be generated and transmitted while eMBB 308 and mMTC 316 are allocated in a specific frequency band and transmitted, URLLC data 310, 312, and 314 may be transmitted with the portions, in which eMBB 308 and mMTC 316 have already been allocated, emptied or not transmitted. Since it is necessary to reduce delay in the URLLC among the above services, the URLLC data 310, 312, and 314 may be allocated and transmitted to a portion of the resource to which the eMBB 308 is allocated. If URLLC data is additionally allocated and transmitted in the eMBB-allocated resource, eMBB data may not be transmitted in the duplicate frequency-time resource, so that the transmission performance of eMBB data may be lowered. In other words, a failure to transmit eMBB data may occur due to the allocation of the URLLC data.

Herein, the terms physical channel and signal may be used interchangeably with data or control signal. For example, PDSCH is a physical channel through which data is transmitted, but in the disclosure, PDSCH may also be data.

As used herein, the term higher layer signaling may refer to a method for transmitting signals from the base station to the UE using a DL data channel of the physical layer or from the UE to the base station using a UL data channel of the physical layer and may be interchangeably used with RRC signaling or MAC CE.

Figure 4:
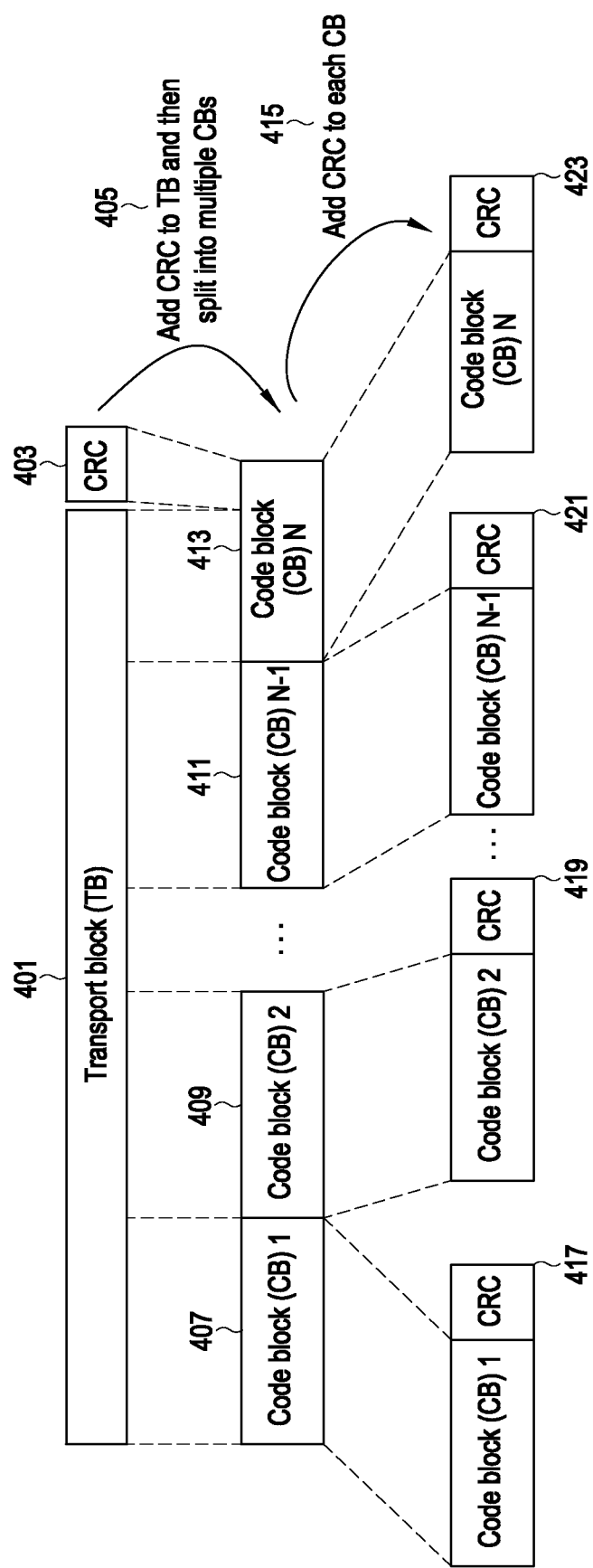
FIG. 4 illustrates an example in which one transport block is divided into several code blocks and a cyclic redundancy check (CRC) is added in a communication system, to which the disclosure is applied.

FIG. 4 illustrates an example process in which one TB is divided into several code blocks and a CRC is added, to which the disclosure is applied.

Referring to FIG. 4, a CRC 403 may be added to the head or tail of one TB 401 which is to be transmitted on UL or DL. The CRC 403 may have a fixed number of bits, e.g., 16 bits or 25 bits, or a variable number of bits depending on, e.g., channel context, and be used to determine whether channel coding succeeds. The CRC (403)-added TB 401 may be divided into several code blocks (CBs) 407, 409, 411, and 413 (405). The maximum sizes of the code blocks may be previously determined, in which case the last code block 413 may be smaller than the preceding code blocks 407, 409, and 411. However, this is only an example, and according to another example, 0, a random value, or 1 may be inserted into the last code block 413, so that the last code block 413 and the other code blocks 407, 409 and 411 have the same length.

CRCs 417, 419, 421, and 423 may be added to the code blocks 407, 409, 411, and 413, respectively (415). The CRC may have a fixed number of bits, e.g., 16 bits or 24 bits, and be used to determine whether channel coding succeeds.

The TB 401 and a cyclic generator polynomial may be used to generate the CRC 403, and the cyclic generator polynomial may be defined in various manners. For example, assuming that a cyclic generator polynomial for a 24-bit CRC meets: gCRC24A(D)=D24+D23+D18+D17+D14+D11+D10+D7+D6+D5+D4+D3+D+1, and L=24, for TB data $a_0, a_1, a_2, a_3, \ldots, a_{A-1}$, CRC $p_0, p_1, p_2, p_3, \ldots, p_{L-1}$ may be determined as the value whose remainder is 0 when $a_0D^{A+23}+a_1D^{A+22}+ \ldots +a_{A-1}D^{24}+p_0D^{23}+p_1D^{22}+ \ldots +p_{22}D^1+p_{23}$ is divided by gCRC24A(D). In the above-described example, it is assumed that the CRC length L is 24 as an example, but the CRC length L may be determined to have a different value, e.g., 12, 16, 24, 32, 40, 48, or 64.

After the CRC is added to the TB through this process, the TB+CRC may be divided into N CBs 407, 409, 411, and 413. CRCs 417, 419, 421, and 423 may be added to the CBs 407, 409, 411, and 413, respectively (415). The CRCs added to the CBs may have different lengths than the CRC added to the TB, or a different cyclic generator polynomial may be used to generate the CRC. The CRC 403 added to the TB and the CRCs 417, 419, 421, and 423 added to the codeblocks may be omitted depending on the type of channel code to be applied to the codeblocks. For example, if an LDPC code, and not a turbo code, is applied to the codeblocks, the CRCs 417, 419, 421, and 423 to be added to the codeblocks may be omitted.

However, even when the LDPC is applied, the CRCs 417, 419, 421, and 423 may be added to the codeblocks. When a polar code is used, the CRCs may also be added or omitted. As described above in connection with FIG. 4, the maximum length of one codeblock is determined depending on the type of channel coding applied to the TB to be transmitted, and depending on the maximum length of the codeblock, the TB and the CRC added to the TB may be divided into codeblocks.

In legacy LTE systems, CB CRCs are added to the divided CBs, and the data bits of the CBs and the CRCs are encoded with channel code, so that coded bits are determined, and the number of bits to be rate-matched is determined as previously agreed on coded bits.

In NR systems, the TBS may be calculated by the following steps.

Step 1: $N'_{RE}$ which is the number of REs allocated for PDSCH mapping in one PRB in the allocated resource is calculated.

$N'_{RE}$ may be calculated as $N_{sc}^{RB} - N_{symb}^{oh} - N_{DMRS}^{PRB} - N_{oh}^{PRB}$. Here, is 12, and may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by the overhead in one PRB configured by higher signaling, and may be set to one of 0, 6, 12, and 18 Thereafter, the total number $N_{RE}$ of REs allocated to the PDSCH may be calculated. $N_{RE}$ is calculated as $\min(156, N'_{RE}) \cdot n_{PRB}$, and $n_{PRB}$ denotes the number of PRBs allocated to the UE.

Step 2: $N_{info}$, which is the number of bits of temporary information, may be calculated as $N_{RE}*R*Q*v$. R is the code rate, Qm is the modulation order, and this information may be transmitted using the MCS bit field of DCI and a pre-arranged table. v is the number of allocated layers. If $N_{info} \leq 3824$, the TBS may be calculated through step 3 below. Otherwise, the TBS may be calculated through step 4.

Step 3: By $$N'_{info} = \max\left(24, 2^n \cdot \left\lfloor \frac{N_{info}}{2^n} \right\rfloor\right) \text{ and } n = \max(3, \lfloor \log_2(N_{info}) \rfloor - 6),$$

$N'_{info}$ may be calculated. The TBS may be determined to be a value closest to $N'_{info}$ among values not smaller than $N'_{info}$ in Table 13 below.

TABLE 13

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |

TABLE 13-continued

| Index | TBS |
|---|---|
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: By $$N'_{info} = \max\left(3840, 2^n \times \text{round}\left(\frac{N_{info} - 24}{2^n}\right)\right) \text{ and}$$

$$n = \max\lfloor \log_2(N_{info} - 24)\rfloor - 5,$$

$N'_{info}$ may be calculated. The TBS may be determined by $N'_{info}$ 0 and [pseudo-code 1] below. In the following, C corresponds to the number of code blocks included in one TB.

[Pseudo-code 1 starts]
if R ≤ 1/4

$$TBS = 8 * C * \left\lceil \frac{N'_{info} + 24}{8*C}\right\rceil - 24, \text{ where } C = \left\lceil \frac{N'_{info} + 24}{3816}\right\rceil$$

else
   if $N'_{info} > 8424$ $$TBS = 8 * C * \left\lceil \frac{N'_{info} + 24}{8*C}\right\rceil - 24, \text{ where } C = \left\lceil \frac{N'_{info} + 24}{8424}\right\rceil$$

else $$TBS = 8 * \left\lceil \frac{N'_{info} + 24}{8*C}\right\rceil - 24$$

end if
end if
[Pseudo-code 1 ends]

When one CB is input to the LDPC encoder in the NR system, it may be output, with parity bits added. In this case, the amount of parity bits may vary depending on an LDCP base graph. A method for sending all of the parity bits generated by LDPC coding for a specific input may be referred to as full buffer rate matching (FBRM), and a method for limiting the number of transmittable parity bits may be referred to as limited buffer rate matching (LBRM). When a resource is allocated for data transmission, the output of the LDPC encoder is created as a circular buffer, and the bits of the created buffer are repeatedly transmitted as much as the allocated resource. In this case, the length of the circular buffer may be designated Ncb.

When the number of all of the parity bits generated by LDPC coding is N, in the FBRM method, Ncb=N. In the LBRM method, $N_{cb}$ is $\min(N, N_{ref})$, $N_{ref}$ is given as $\lfloor G \cdot R_{LBRM} \text{ TBS}_{LBRM}\rfloor$, and $R_{LBRM}$ may be determined as 2/3. To obtain $\text{TBS}_{LBRM}$ the above-described method for obtaining TBS is used, assuming the maximum number of layers and maximum modulation order supported by the UE in the cell. The maximum modulation order Qm is assumed to be 8, if an MCS table supporting 256QAM is used for at least one BWP in the cell, or otherwise, 6 (64QAM). The code rate is assumed to be the maximum code rate, i.e., 948/1024. $N_{RE}$ is assumed to be $156 \cdot n_{PRB}$ and $n_{PRB}$ is assumed to be $n_{PRB,LBRM}$. $n_{PRB,LBRM}$ may be given in Table 14 below.

TABLE 14

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In Table 14, the maximum data rate supported by the UE in the NR system may be determined through Equation (2) below.

$$\text{data rate (in Mbps)} = 10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)})\right) \quad (2)$$

In Equation (2), J is the number of carriers bundled by carrier aggregation, Rmax=948/1024, $v_{Layers}^{(j)}$ is the maximum number of layers, $Q_m^{(j)}$ is the maximum modulation order, $f_{(j)}$ is the scaling index, and μ is the subcarrier spacing. As $f_{(j)}$ one of 1, 0.8, 0.75, and 0.4 may be reported by the UE and μ may be given in Table 15 below.

TABLE 15

| μ | Δf = $2^\mu$ · 15[kHz] | Cyclic prefix |
|---|---|---|
| 0 | 15 | Normal |
| 1 | 30 | Normal |

TABLE 15-continued

| μ | Δf = $2^\mu$ · 15[kHz] | Cyclic prefix |
|---|---|---|
| 2 | 60 | Normal, Extended |
| 3 | 120 | Normal |
| 4 | 240 | Normal |

In Table 15, $T_s^\mu$ is the average OFDM symbol length, $T_s^\mu$ may be calculated as $$\frac{10^{-3}}{14 \cdot 2^\mu},$$

and $N_{PRB}^{BW(j),\mu}$ is the maximum number of RBs in BW(j). $OH^{(j)}$, as an overhead value, may be given as 0.14 for DL and 0.18 for UL in FR1 (band below 6 GHz), and as 0.08 for DL and 0.10 for UL in FR2 (band above 6 GHz). Through Equation [2], the maximum data rate in DL in a cell having a 100 MHz frequency bandwidth at a 30 kHz subcarrier spacing may be calculated as in Table 16 below.

TABLE 16

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate that the UE may measure in actual data transmission may be a value obtained by dividing the amount of data by the data transmission time. This may be a value obtained by dividing the TBS by the transmission time interval (TTI) length for 1 TB transmission or dividing the sum of TBSs by the TTI length for 2 TB transmission. As an example, as assumed to obtain Table 16, the maximum actual data rate in DL in the cell having the 100 MHz frequency band in the 30 kHz subcarrier spacing may be determined as shown below in Table 17 according to the number of PDSCH symbols allocated.

TABLE 17

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be identified via Table 16, and the actual data rate following the allocated TBS may be identified via Table 17. In some cases, the actual data rate may be larger than the maximum data rate depending on scheduling information.

In some NR systems, a data rate supportable by the UE may be agreed on between the base station and the UE. This may be calculated using, e.g., the maximum frequency band, maximum modulation order, and maximum number of layers supported by the UE. However, the calculated data rate may be different from a value calculated from the size of the TB, TBS and TTI used for actual data transmission.

Thus, the UE may be assigned a larger TBS than the value corresponding to the data rate supported by the UE. To prevent this, a limit may be imposed on the TBS schedulable depending on the data rate supported by the UE.

Figure 5:
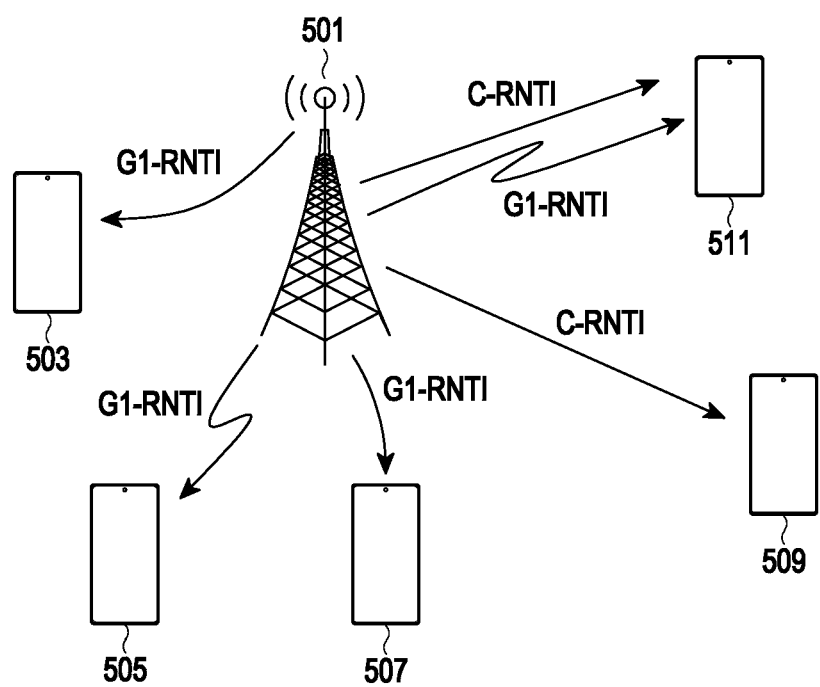
FIG. 5 illustrates an example of a signal transmission/reception scheme for a groupcast service in a wireless communication system according to an embodiment.

FIG. 5 illustrates an example of a signal transmission/reception scheme for a groupcast service in a wireless communication system according to an embodiment.

An example of groupcast in which a base station 501 transmits the same control information and the same data to a plurality of UEs, e.g., UEs 503, 505, 507, and 511 is described in connection with FIG. 5. The base station provides a group radio network temporary identifier (G-RNTI), which may be used to receive control information for groupcast, to the UEs 503, 505, 507, and 511 via an SIB, preset information, or a preset message.

Each of the UEs 503, 505, 507, and 511 may receive the G-RNTI transmitted from the base station 501 and receive control information for groupcast using the G-RNTI, which may be scrambled to a CRC of control information for groupcast, e.g., DLDCI and may be transmitted.

In FIG. 5, a UE 509 may access the base station 501 and receive a cell radio network temporary identifier (C-RNTI) from the base station 501. A UE 511 may access the base station 501 and may receive the C-RNTI and G-RNTI for groupcast from the base station 501.

When the same control information and data are transmitted and one or more UEs may receive the same control information and data may be referred to as groupcast for the control information and data. When C-RNTI or a specific RNTI is received by a UE, e.g., the UE 509 or the UE 511 of FIG. 5, and only specific UEs may receive control information and data using the C-RNTI or the specific RNTI may be referred to as unicast for the control information and data.

The UE may be configured to receive control channel signals and data channel signals for groupcast from transmit end A, and control channel signals and data channel signals for unicast from transmit end B. Transmit end A and transmit end B may be the same or different transmit ends. Each of transmit end A and transmit end B may be a base station, a vehicle, or a UE. When each of transmit end A and transmit end B is a base station 511, groupcast data and unicast data may be transmitted from the base station 511 through an access Uu link. The Uu denotes a radio interface between the base station and the UE.

When each of transmit end A and transmit end B is a vehicle or a UE 503, 505, . . . , 511, the groupcast transmission and the unicast transmission may be sidelink (also referred to as device to device or D2D) transmissions. In this case, each of transmit end A and transmit end B may be a UE operating as a leader node or an anchor node in the group, may perform groupcast transmission for at least one other UE in the group, and may perform the operation of receiving control information from the at least one other UE. Transmit end A may be a vehicle and transmit end B may be a base station. Although it is described under the assumption that transmit end A and transmit end B are a single transmit end, embodiments of the disclosure may also be applied even when transmit end A and transmit end B are different transmit ends.

The UE may receive, from the base station or another UE in the group (i.e., the other UE in the group may be a leader node), an RNTI (in the following description, it should be noted that the RNTI corresponding to the unique ID may be interchangeably used with, e.g., G-RNTI or group-common RNTI, or group identifier, for receiving control channel signals and data channel signals for groupcast) corresponding to a unique identifier for receiving control channel signals and data channel signals for groupcast. The UE may receive a control channel signal for groupcast using the G-RNTI and may receive a data channel signal based on the control channel signal for groupcast.

A control channel for data scheduling may be interchangeably used with a PDCCH or a PSCCH, data channel may be interchangeably used with a PDSCH or physical sidelink shared channel (PSSCH), and feedback channel may be interchangeably used with a PUCCH or a PSCCH. Although control information for scheduling, received by the UE, is assumed to be DCI as an example, the control information for scheduling may be implemented in other various forms than DCI. The control information transferred in the PSCCH may be referred to as SCI.

Herein, the examples of what is described as a higher-level signal (or higher-level signal, higher-layer signaling, high-level signal) may mean UE common higher signals, such as MIB or SIB, or UE-specific higher signals, such as RRC or MAC CE.

Herein, the examples of what is described as an L1 signal may refer to a specific field in DCI, DCI format information, RNTI information scrambled with CRC of DCI, or control resource set resource information through which DCI is transmitted/received.

In the disclosure, embodiments for signal transmission/reception schemes for groupcast or multicast provide methods and devices related to what data to receive and how to transmit HARQ feedback information for received data when data for groupcast is transmitted to UEs, when the UEs are RRC connected UEs, and when data for unicast or broadcast is received along with data for groupcast. Hereinafter, for ease of description, data for groupcast is referred to as groupcast data, and data for unicast is referred to as unicast data. Control information for groupcast is referred to as groupcast control information, and control information for unicast is referred to as unicast control information.

Prioritizing reception of specific data may refer to decoding the specific data but not decoding other data than the specific data. For example, prioritizing reception of groupcast data may indicate that the UE decodes groupcast data but does not decode other data (e.g., unicast data) than the groupcast data. Similarly, reception of unicast data may be prioritized and, in this case, groupcast data is not decoded. Prioritizing reception of the specific data may include not receiving other data.

Decoding data may include performing demodulation on the data and storing a calculated log likelihood ratio (LLR) value in the soft buffer. Alternatively, decoding the specific data may include transmitting HARQ feedback information for the specific data but not transmitting HARQ feedback information for other data than the specific data or transmitting it as a NACK value or feeding back any value for the other data than the specific data.

Groupcast data and unicast data may be distinguished according to the field included in the DCI or according to the RNTI value scrambled to the CRC of the DCI. Although processing for groupcast data and unicast data is described as an example, this may also be applied to processing for groupcast control information and unicast control information.

As an example, when DCI for groupcast and DCI for unicast are received (scheduled) simultaneously or in the same slot, various methods described below may be considered in determining which one of the DCI for groupcast and the DCI for unicast is to be first decoded.

Simultaneously receiving groupcast data and unicast data may include scheduling the resource region, in which data for groupcast is allocated, and the resource region, in which data for unicast is allocated, to overlap in at least some resources (e.g., at least one symbol or at least one slot), at least, in terms of time resources or in terms of time and frequency resources.

Groupcast data and unicast data may be scheduled by their respective control information or may be scheduled without separate control information. Scheduling data without separate control information is semi-persistent scheduling (SPS) or configured grant (CG) scheduling, and the SPS or CG scheduling may be performed by previously transmitting scheduling information via higher layer signaling and indicating the scheduling resource or transmission time via DCI. Alternatively, the SPS or CG scheduling may be starting transmission of data without DCI transmission. In contrast, dynamic scheduling may be scheduling by providing information, such as transmission resource, transmission time, MCS, or HARQ process ID, through DCI whenever data is transmitted. Accordingly, groupcast data may be transmitted by semi-static scheduling or dynamic scheduling, and unicast data may also be transmitted by semi-static scheduling or dynamic scheduling.

When the UE is simultaneously scheduled for groupcast data and unicast data, this indicates that the UE is simultaneously scheduled for groupcast data and unicast data in one carrier (cell) or one BWP or in different carriers.

The UE may not expect to be simultaneously scheduled for groupcast data and unicast data. If such simultaneous scheduling occurs, the UE may regard this as an error case or may arbitrarily receive one of groupcast data and unicast data by the simultaneous scheduling. UEs reporting specific UE capability may correspond to UEs receiving the one data, or UEs (i.e., operating as default) not reporting the specific UE capability may correspond to UEs receiving the one data.

The UE may be simultaneously scheduled for groupcast data and unicast data and may also receive it simultaneously. In this case, the UE may decode both the data without the need for prioritizing decoding of specific data of the groupcast data and the unicast data. UEs reporting specific UE capability may correspond to UEs that may be scheduled for both the data, or UEs (i.e., operating as default) not reporting the specific UE capability may correspond to UEs that may be scheduled for both the data.

When the UE is scheduled for groupcast data and unicast data to at least partially overlap in terms of time domain resources (e.g., at least one symbol or at least one slot), the UE may receive the data simultaneously without any condition or may receive the data simultaneously or decode one data first according to at least one of the following conditions.

In the following, receiving groupcast data and/or unicast data may include scheduling the corresponding data to the UE, and receiving one data of the two data first(preferentially) may be appreciated as including that decoding the one data and not decoding the other data.

The two data of groupcast data and unicast data have been described as an example, but various embodiments may be applied, in the same or similar manner, even where at least one of two or more different data is first received.

(1) Condition A1

When HARQ-ACK feedback is required for reception of groupcast data, the UE may decode any one of groupcast data and unicast data first and, when HARQ-ACK feedback is not required for reception of groupcast data, the UE may simultaneously decode the two types of data, groupcast data and unicast data. The reason is that HARQ-ACK feedback is present in unicast data, whereas HARQ-ACK feedback is not or may be not present in groupcast data. When the UE performs HARQ ACK feedback for groupcast data, the UE needs to perform data processing more quickly than when not performing HARQ-ACK feedback. Thus, the UE may not simultaneously decode the two types of data but may instead first decode any one of the groupcast data and unicast data. Whether to perform the HARQ-ACK feedback for the groupcast may be determined by a higher layer signal or an L1 signal (e.g., DCI).

The HARQ-ACK feedback may be included in the PUCCH or the PUSCH and transmitted from the UE to the base station, and it is equally applicable thereafter. In sidelink communication, the HARQ-ACK feedback may be included in a physical sidelink feedback channel (PSFCH) and transmitted to at least one counterpart UE. The HARQ-ACK feedback may be HARQ-ACK information, which is in the form of transmitting a NACK, when decoding fails, and be in the form of transmitting an ACK, when decoding succeeds. The HARQ-ACK feedback may be in the form of transmitting no ACK, when decoding succeeds, and be in the form of transmitting a NACK only when decoding fails.

(2) Condition A2

When the groupcast data-allocated resource region and the unicast data-allocated resource region overlap in at least part of the time resource and/or frequency resource, the UE may decode one of the groupcast data and unicast data earlier than the other. Otherwise, the two types of data are simultaneously decoded. The reason is that when resources at least partially overlap, specific data may be punctured so that it may be difficult to succeed in data decoding in terms of the UE. Thus, in terms of the UE, it may be reasonable to decode the non-punctured data earlier. If specific data is rate-matched, rather than punctured, by the overlapping resource regions, the UE may simultaneously decode the two types of data. Puncturing refers to transmitting/receiving data in the remaining resource region except for the overlapping resource regions after data is allocated in the scheduled resource region. Thus, some data resources may be dropped rather than being actually transmitted/received. Rate matching refers to allocating data in a non-overlapping region considering an overlap and transmitting/receiving the data. Thus, all data resources are actually transmitted/received.

(3) Condition A3

If the size of the data-allocated frequency resource region is a predetermined threshold or more, the UE may decode one of groupcast data and unicast data earlier than the other and, otherwise, decode the two types of data simultaneously. The reason is that if the frequency resource region is large in receiving data, the size of the data, as well as the size of the resource region, is increased, and the time for the UE to process data may increase. Thus, in such a case, the UE may decode one type of data earlier, rather than simultaneously decoding the two types of data. The size of the data-allocated frequency resource region may be the size of groupcast data-allocated resource region, the size of unicast data-allocated resource region, or the sum of the size of groupcast data-allocated resource region and the size of unicast data-allocated resource region. The size unit of the frequency resource region is an RB or PRB, and the threshold may be a specific fixed value or may be a value set by a higher layer signal or L1 signal (e.g., DCI). In the condition A3, the size of the frequency resource region may be replaced with the TBS or the MCS size.

(4) Condition A4

When processing time capability for data reception is the fast processing time defined below in the 3GPP standards, the UE may decode one of groupcast data and unicast data earlier than the other. When processing time capability for data reception is the slow processing time defined below in the 3GPP standards, the UE may simultaneously decode the two types of data. The reason is that in the case of fast processing time, the UE needs to more quickly transmit HARQ-ACK information for data reception, so that it may be considered to decode one type of data earlier in terms of implementation complexity. The fast processing time may be PDSCH processing capability 2 of 3GPP standard TS 38.214 Ch. 5.3. The slow processing time may be PDSCH processing capability 1 of 3GPP standard TS38.214 Ch. 5.3. The processing time defined with the PDSCH processing capability is the minimum time (or symbol) when the UE may start transmission of PUCCH or PUSCH including HARQ-ACK information immediately after the last symbol where the UE receives PDSCH.

The fast processing time has a smaller minimum time value than the slow processing time. In other words, the UE may transmit HARQ-ACK information faster in the fast processing time, and it may be suitable for services where latency matters. The base station may notify the UE whether the processing time capability for data reception is the fast processing time or slow processing time through a higher layer signal or L1 signal. The data reception may be groupcast data, unicast data, or one of the two types of data. When processing time capability differs for groupcast data and unicast data, the UE may regard it as the processing time capability of groupcast data, the processing time capability of unicast data, slow processing time, or fast processing time.

(5) Condition A5

By an L1 signal (e.g., DCI), the base station may instruct the UE to decode one of the groupcast data and the unicast data earlier than the other or to decode both types of data. This is done to increase the degree of freedom in scheduling of the base station. When both the data are decoded, the decoding may be performed simultaneously or sequentially.

(6) Condition A6

When a BWP for receiving groupcast data and a BWP for receiving unicast data differ, the UE may decode one of the groupcast data and unicast data earlier than the other. When a BWP for receiving groupcast data and a BWP for receiving unicast data are the same, the UE may decode both types of data. When both types of data are decoded, the decoding may be performed simultaneously or sequentially. This is done since there is a possibility that the UE receives data only in one BWP. If one UE has the ability to simultaneously receive data for two BWPs, the UE may decode the two types of data even when the BWP for receiving groupcast data and the BWP for receiving unicast data are different.

(7) Condition A7 When groupcast data and unicast data, which are different types of data, are scheduled together, the UE may decode both types of data. When first unicast data or second unicast data (as another example, first multicast data or second multicast data), which are different but the same type, are scheduled together, the UE may decode one of the two types of data earlier than the other.

When the UE decodes at least one of a plurality of data, earlier than the others, by each, or a combination of at least one of, the above conditions A1 to A7, at least one of the following methods may apply. The following methods have been described by taking two types of data, groupcast data and unicast data, as an example, for convenience. The UE may identify whether groupcast data and unicast data are scheduled in the following methods through reception of the scheduling information. The scheduling information may be provided to the UE through a higher layer signal or an L1 signal. Alternatively, in the case of condition A7, the UE may apply at least one of methods A4 to A6 if decoding at least one type of data among a plurality of data earlier than the others and, in the case of condition A7, the scheduled data may be regarded as the same type of data in methods A4 to A6.

(1) Method A1

When groupcast data and unicast data are simultaneously scheduled for the UE, the UE may decode the unicast data earlier than the groupcast data. The reason is that, in light of scheduling by the base station, simultaneous transmission of unicast data and groupcast data may indicate that there is important information to be transmitted to the UE that will receive the unicast data. If unicast data is not prioritized, there is no reason for the base station to transmit unicast, so that simultaneous transmission of unicast data and groupcast data may not occur.

(2) Method A2

When groupcast data and unicast data are simultaneously scheduled for the UE, the UE may decode the groupcast data earlier than the unicast data. This case may be, e.g., transmission of an emergency message in which processing of groupcast data is prioritized.

(3) Method A3

When groupcast data and unicast data are simultaneously scheduled for the UE, information indicating which data of the groupcast data and the unicast data is to be decoded earlier may be provided to the UE. The information may be configured in the UE through a higher layer signal or an L1 signal.

(4) Method A4

When groupcast data and unicast data may be simultaneously scheduled for the UE, and each data is scheduled by DCI, the UE may decode the data scheduled by the latest received DCI earlier than the other.

Figure 6:
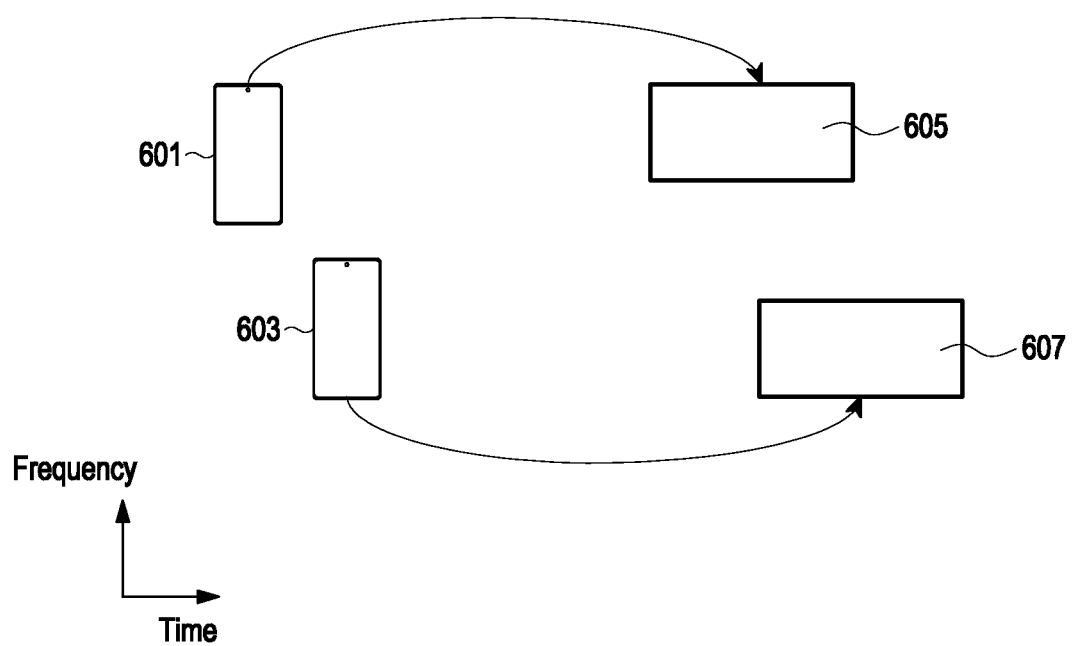
FIG. 6 illustrates a data scheduling method according to an embodiment.

FIG. 6 illustrates a data scheduling method according to a first embodiment.

In FIG. 6, if method A4 is applied, the base station schedules groupcast data 605 for the UE by first DCI 601 and schedules unicast data 607 for the UE by second DCI 603. If the second DCI 603 is received after the first DCI 601, the UE may decode the unicast data 607 scheduled by the second DCI 603 first. The determination of the time of reception of DCI may be based on the first symbol or last symbol of the transmitted/received control information resource.

(5) Method A5

When groupcast data and unicast data may be simultaneously scheduled for the UE, and one of these data types is scheduled by DCI while the other is an SRS without DCI, the UE may decode the data scheduled by DCI earlier than the other.

Figure 7:
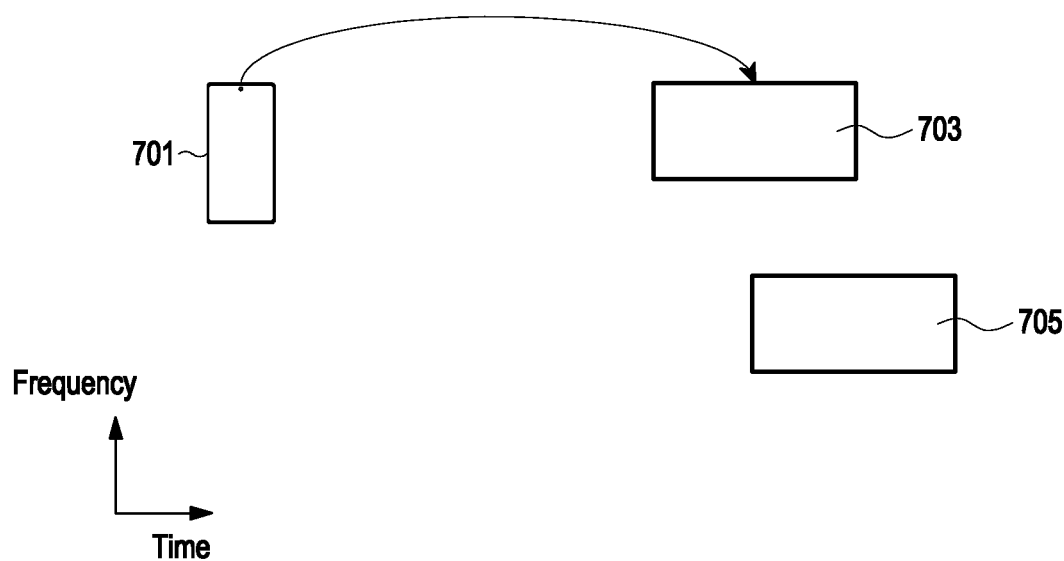
FIG. 7 illustrates a data scheduling method according to an embodiment.

FIG. 7 illustrates a data scheduling method according to a second embodiment.

Referring to FIG. 7, e.g., if method A5 is applied, groupcast data 703 may be scheduled for the UE by DCI 701, and if unicast data 705 is an SPS, the UE may decode the groupcast data 703 earlier than the unicast data 705.

(6) Method A6

When groupcast data and unicast data may be simultaneously scheduled for the UE, and each data is an SPS, the UE may decode the data with the lowest SPS index (or highest SPS index) earlier than the other.

Figure 8:
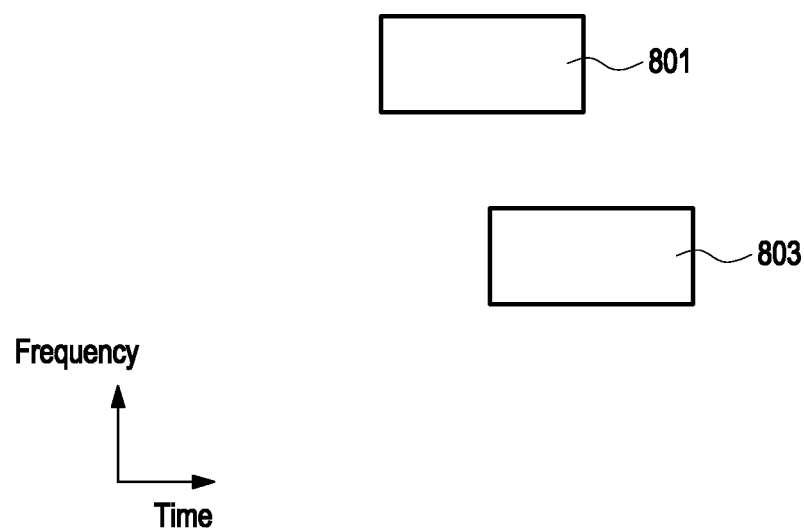
FIG. 8 illustrates a data scheduling method according to an embodiment.

FIG. 8 illustrates a data scheduling method according to a third embodiment.

Referring to FIG. 8, e.g., if method A6 is applied, when the SPS index of the groupcast data 801 is 3 and the SPS index of the unicast data 803 is 1, the UE may decode the unicast data 803 earlier than the groupcast data 801.

(7) Method A7

When groupcast data and unicast data are simultaneously scheduled for the UE, the UE may determine which one of the groupcast data and the unicast data it is to decode first based on an indicator included in the DCI. For example, an indicator indicating a quality-of-service (QoS) value or a priority value may be included in DCI for groupcast, and a threshold for QoS or a threshold for priority may be set through higher layer signaling. The indicator indicating the QoS value is referred to as a "QoS indicator," and the indicator indicating the priority value is referred to as a "priority indicator." The threshold for the QoS value is referred to as a "QoS threshold," and the threshold for priority is referred to as a "priority threshold."

As an example, the UE for which groupcast data and unicast data are simultaneously scheduled may compare the QoS threshold with the QoS value indicated by the QoS indicator included in the DCI for groupcast and determine whether to process the groupcast data first based on the result of comparison. For example, when the QoS value indicated by the QoS indicator included in the DCI for groupcast meets the QoS threshold, the UE may decode the groupcast data first.

Alternatively, both the DCI for groupcast and the DCI for unicast may include a QoS indicator. In this case, the UE may compare the QoS value indicated by the QoS indicator included in the DCI for groupcast with the QoS value indicated by the QoS indicator included in the DCI for unicast and may determine which of the group cast data and the unicast data is to be processed first based on the result of comparison. In this case, the UE may first decode the data having the relatively greater QoS value indicated by the QoS indicators.

As another example, the UE for which groupcast data and unicast data are simultaneously scheduled may compare the priority threshold with the priority value indicated by the priority indicator included in the DCI for groupcast and determine whether to process the groupcast data first based on the result of comparison. For example, when the priority value indicated by the priority indicator included in the DCI for groupcast meets the priority threshold, the UE may decode the groupcast data first.

Alternatively, both the DCI for groupcast and the DCI for unicast may include a priority indicator. In this case, the UE may compare the priority value indicated by the priority indicator included in the DCI for groupcast with the priority value indicated by the priority indicator included in the DCI for unicast and may determine which of the group cast data and the unicast data is to be processed first based on the result of comparison. In this case, the UE may first decode the data having the relatively greater priority value indicated by the priority indicators.

(8) Method A8

When groupcast data and unicast data are simultaneously scheduled for the UE, it may be determined which of the groupcast data and the unicast data is to be decoded first, differently depending on whether dynamic scheduling or configured grant (CG) scheduling (or SPS) is applied.

The SPS or CG scheduling may be performed by previously transmitting scheduling information through higher layer signaling and indicating, e.g., scheduling resource or transmission time through DCI. Alternatively, the SPS or CG scheduling may be starting transmission of data without DCI transmission. In contrast, dynamic scheduling may be scheduling by providing information, such as transmission resource, transmission time, MCS, or HARQ process ID, through DCI whenever data is transmitted.

As an example, when unicast data is transmitted based on CG scheduling (or SPS) while groupcast data is simultaneously transmitted based on dynamic scheduling through DCI, i.e., when CG scheduling (or SPS)-based unicast data and dynamic scheduling-based groupcast data are simultaneously scheduled for the UE, the UE may prioritize dynamic scheduling over CG scheduling (or SPS) to decode the dynamic scheduling-performed groupcast data first.

Alternatively, when groupcast data is transmitted based on CG scheduling (or SPS) while unicast data is simultaneously transmitted based on dynamic scheduling through DCI, i.e., when CG scheduling (or SPS)-based groupcast data and dynamic scheduling-based unicast data are simultaneously scheduled for the UE, the UE may prioritize dynamic scheduling over CG (or SPS) scheduling to first decode the dynamic scheduling-performed unicast data.

(9) Method A9 When groupcast data and unicast data are simultaneously scheduled for the UE, it may be determined which of the groupcast data and the unicast data is to be decoded first, depending on whether HARQ feedback information is to be transmitted. For example, if transmission of HARQ feedback information for groupcast data is disabled, decoding of groupcast data may not be prioritized. In contrast, if transmission of HARQ feedback information for unicast data is disabled, decoding of unicast data may not be prioritized. In other words, method A9 may refer to the data for which HARQ feedback information needs to be transmitted is decoded first.

The above-described QoS value or priority value to be applied to various embodiments may be transmitted via a QoS parameter called the 5G QoS identifier (5QI) in the 5G system. A resource type, a default priority level, a packet delay budget, a packet error rate, a default maximum data burst volume, and a default averaging window may be mapped to one 5QI value, which may be defined as illustrated in Table 18A, Table 1B and Table 18C below, which are obtained by dividing the mapping table for 5QI values.

TABLE 18A

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 15) | $10^{-6}$ | N/A | 2000 ms | "Live" Uplink Streaming (e.g. TS 26.238 [76]) |
| 72 | | 56 | 300 ms (NOTE 11, NOTE 15) | $10^{-4}$ | N/A | 2000 ms | "Live" Uplink Streaming (e.g. TS 26.238 [76]) |
| 73 | | 56 | 300 ms (NOTE 11, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 75 | | 56 | 500 ms | $10^{-4}$ | N/A | 2000 ms | "Live" Uplink Streaming (e.g. |

TABLE 18B

| | | | (NOTE 11, NOTE 15) | | | | TS 26.238 [76]) |
|---|---|---|---|---|---|---|---|
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms | $10^{-6}$ | N/A | N/A | Video (Buffered Streaming) |
| 9 | | 90 | (NOTE 13) | | | | TCP-based (e.g., www, e-mail, chat, ftp, p2p file sharing, progressive video, etc.) |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical | 19 | 10 ms (NOTE 4) | $10^{-4}$ | 255 bytes | 2000 ms | Discrete Automation (see TS 22.261 [2]) |

TABLE 18B-continued

| 83 | GBR | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution- high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the

TABLE 18C

5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 5:
A delay of 2 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 6:
A delay of 5 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 7:
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these SQIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst, in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72].
NOTE 15:
For "live" uplink streaming (see TS 26.233 [76]), guidelines for PDB values of the different SQIs correspond to the latency configurations defined in TR 26.939 [77]. In order to support higher latency reliable streaming services (above 500 ms PDB), if different PDB and PER combinations are needed these configurations will have to use non-standardised 5QIs.

As shown in Table 18A, Table 18B and Table 18C, e.g., the 5QI value, 82, may be mapped to such parameters as a resource type of delay critical guaranteed bit rate (GBR), a default priority level of 19, a packet delay budget of 10 ms, a packet error rate of 104, and a default maximum data burst volume of 255 bytes.

To indicate the priority of groupcast data or unicast data, it is possible to set a set of 5QI values that may be possessed by the data which may be transmitted/received in a corresponding carrier or BWP. For example, a specific BWP may be determined in the BWP that data which has the 5QI values of 1, 2, 4, 5, 6, 82, 83, and 84 is transmitted/received. In this case, it may be considered that data having a 5QI value other than the eight 5QI values of {1, 2, 4, 5, 6, 82, 83, 84} is not transmitted/received in the corresponding BWP. In this case, the control information in the corresponding BWP may be provided to, e.g., the UE receiving the DCI, through the 5QI field included in the DCI.

For example, if it is configured that data having 5QI values of 1, 2, 4, 5, 6, 82, 83, and 84 is transmitted/received in the BWP, 3 bits included in the DCI may be used as a 5QI indicator indicating one of the 5QI values of {1, 2, 4, 5, 6, 82, 83, 84}. Accordingly, the UE may receive configuration information for configuring the 5QI value that may be owned by the data corresponding to the BWP configuration. The base station may determine the size of the 5QI indicator field included in the DCI transmitted in the corresponding BWP. For example, when the configuration information indicating the 5QI value is configured to indicate that data transmitted via the BWP may correspond to one of N 5QI values, the 5QI indicator field may have a size of, but it should be noted that embodiments are not limited thereto. The base station may transmit DCI including 5QI information based on the determined size of the 5QI indicator field. The UE receiving the DCI may interpret the 5QI (indicator) field included in the DCI and thus may identify 5QI information applied to data scheduled through the DCI.

Figure 9A:
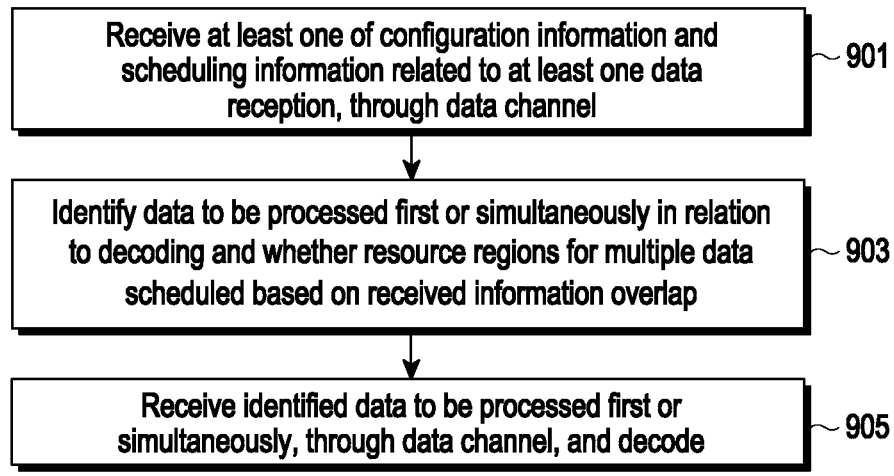
FIG. 9A illustrates a communication method by a UE according to an embodiment.

FIG. 9A illustrates a communication method by a UE according to an embodiment.

Referring to FIG. 9A, in step 901, the UE receives at least one of configuration information and scheduling information for receiving various data, such as groupcast data and unicast data carried in a data channel. The data channel may be a PDSCH or a PSSCH in the case of sidelink communication. The received information may include information for identifying whether the PDSCH is scheduled by DCI or is SPS or may include information for identifying whether the PSSCH is scheduled by SCI or is SPS. The received information may include information for identifying whether the PDSCH or PSSCH carries groupcast data or unicast data. The received information may include information for identifying whether it is a PDSCH/PSSCH requiring HARQ-ACK feedback or a PDSCH/PSSCH not requiring HARQ-ACK feedback. At least one of the configuration information and the scheduling information may include information related to prioritized or simultaneous processing of data according to the above-described embodiments.

Thereafter, in step 903, the UE determines whether the resource regions for multiple data scheduled for the UE overlap and data to be subject to prioritized or simultaneous processing in relation to decoding, based on at least one of the received configuration information and scheduling information. For example, as in the above-described embodiments, the UE may identify a resource area, where groupcast data is allocated, and a resource area, where unicast data is allocated, to determine whether resources overlap and may determine whether to perform prioritized or simultaneous processing on the scheduled data in relation to decoding.

At least one of the received configuration information and the scheduling information may include information corresponding to one of, or a combination of at least one of, conditions A1 to A7 described above according to various embodiments. At least one of the received configuration information and the scheduling information may include information corresponding to one of, or a combination of at least one of, methods A1 to A9 described above. Further, at least one of the received configuration information and scheduling information may include information corresponding to a combination of at least one of the conditions and methods.

Thereafter, in step 905, the UE receives and decodes the identified data to be processed first(preferentially) or simultaneously. For example, the UE may receive, through a data channel, and decode data to be processed first or simultaneously among a plurality of data, such as groupcast data and unicast data. If HARQ-ACK information reporting is needed, the UE performs HARQ-ACK feedback therefor. The HARQ-ACK feedback may be transmitted through PUCCH or PUSCH and, in the case of sidelink communication, it may be transmitted through PSFCH.

Figure 9B:
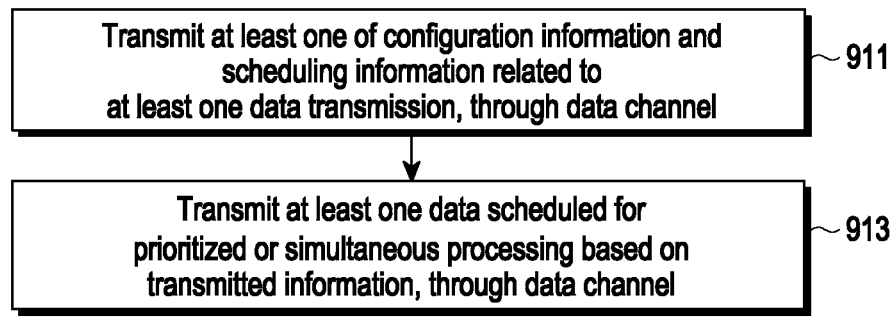
FIG. 9B illustrates a communication method by a base station according to an embodiment.

FIG. 9B illustrates a communication method by a base station according to an embodiment.

Referring to FIG. 9B, in step 911, the base station transmits at least one of the above-described configuration information and scheduling information related to at least one type of data carried through a data channel. In step 913, the base station transmits, through the data channel, at least one type of data scheduled for prioritized or simultaneous processing based on the transmitted information. If the base station needs reception of HARQ-ACK information from the UE, the base station receives HARQ-ACK feedback therefor from the UE. The HARQ-ACK feedback may be received through PUCCH or PUSCH.

When FIG. 9B is applied to sidelink communication, the base station may be a transmitting UE that transmits data through a PSSCH. In this case, at least one of the configuration information and the scheduling information may be provided from at least one of the base station and the transmitting UE. The HARQ-ACK feedback may be received through a feedback channel (PSFCH) from a receiving UE that has received data through the data channel (PSSCH).

When a plurality of data transmissions having different types or different QoS/priorities are scheduled in a wireless communication system supporting groupcast, efficient data communication is rendered possible.

Hereinafter, the processing time of the UE in the disclosure is described. This embodiment may be implemented by combining at least one of the conditions and methods described above or in combination with each condition or each method.

In the 5G or NR system, when the base station transmits a PDSCH including DL data, the DCI for scheduling the PDSCH may indicate the $K_1$ value, which is a value corresponding to information for the timing when the UE transmits HARQ-ACK information for the PDSCH. Unless it is instructed to transmit HARQ-ACK information earlier than OFDM symbol $L_1$ by including the timing advance, the UE may transmit it to the base station. In other words, the HARQ-ACK information may be transmitted from the UE to the base station simultaneously with or later than the OFDM symbol $L_1$ by including the timing advance. When it is instructed to transmit HARQ-ACK information earlier than OFDM symbol $L_1$ by including the timing advance, the HARQ-ACK information may not be valid HARQ-ACK information in HARQ-ACK transmission from the UE to the base station. OFDM symbol $L_1$ may be the first symbol at which cyclic prefix (CP) begins $T_{proc,1}$ after the last time of the last OFDM symbol of the PDSCH. $T_{proc,1}$ may be calculated as in Equation (3) below.

$$T_{proc,1} = ((N_1 + d_{1,1} + d_{1,2})(2048 + 144) \cdot \kappa 2^{-\mu}) \cdot T_C \quad (3)$$

In Equation (3) $N_1$, $d_{1,1}$, $d_{1,2}$, $\kappa$, $\mu$, $T_C$ may be defined as follows.

$N_1$ is based on the $\mu$ value presented in Table 19 and Table 20 below and matches $\mu$ producing the largest $T_{proc,\,1}$ among ($\mu_{PDCCH}$, $\mu_{PDSCH}$, $\mu_{UL}$). That is, $\mu = \min(\mu_{DCCH}, \mu_{PDSCH}, \mu_{UL})$. In the above expression, $\mu_{PDCCH}$ denotes the subcarrier spacing applied to PDCCH scheduling. $\mu_{PDSCH}$ denotes the subcarrier spacing applied to the scheduled PDSCH. $\mu_{UL}$ denotes the subcarrier spacing of the UL channel through which HARQ-ACK is transmitted.

If HARQ-ACK information is transmitted over the PUCCH, $d_{1,1}=0$, and if HARQ-ACK information is transmitted over the PUSCH, $d_{1,1}=1$.

When the UE is configured with a plurality of activated component carriers (CCs) or carriers, the maximum timing difference between carriers may be reflected in the second signal transmission.

In the case of PDSCH mapping type A, that is, when the first DMRS OFDM symbol position is the third or fourth OFDM symbol of the slot, if the position index i of the last OFDM symbol of the PDSCH is less than 7, $d_{1,2}=7-i$. Otherwise, $d_{1,2}=0$.

For UE processing capability 1 described above, in the case of PDSCH mapping type B, that is, when the first DMRS OFDM symbol position is the first OFDM symbol of the PDSCH, if the length of the PDSCH is 4 OFDM symbols, $d_{1,2}=3$, and if the length of the PDSCH is 2 OFDM symbols, $d_{1,2}=3+d$, where d is the number of OFDM symbols in which the PDSCH and the PDCCH including the control information for scheduling the corresponding PDSCH overlap. Otherwise, $d_{1,2}=0$.

For UE processing capability 2 described above, in the case of PDSCH mapping type B, that is, when the first DMRS OFDM symbol position is the first OFDM symbol of the PDSCH, if the length of the PDSCH is 2 or 4 OFDM symbols, $d_{1,2}$ is the number of OFDM symbols in which the PDSCH and the PDCCH including the control information for scheduling the corresponding PDSCH overlap. Otherwise, $d_{1,2}=0$.

$N_1$ is defined as in Table 19 or 20 below according to μ. μ=0, 1, 2, and 3 indicate subcarrier spacing is 15 kHz, 30 kHz, 60 kHz, and 120 kHz, respectively. Table 19 below shows an example of the PDSCH processing time for UE processing capability 1 (PDSCH processing time for PDSCH processing capability 1, slow processing time), and Table 20 below shows an example of the PDSCH processing time for UE processing capability 2 (PDSCH processing time for PDSCH processing capability 2, fast processing time).

TABLE 19

| μ | PDSCH decoding time $N_1$ [symbols] | |
|---|---|---|
| | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

TABLE 20

| μ | PDSCH decoding time $N_1$ [symbols] | |
|---|---|---|
| | No additional PDSCH DM-RS configured | Additional PDSCH DM-RS configured |
| 0 | 3 | 13 |
| 1 | 4.5 | 13 |
| 2 | 9 for FR1 | 20 |

$N_1$ may be used as shown in Table 19 or Table 20 according to UE capability or may be set by a higher layer signal from the base station.

$$T_c = \frac{1}{(\Delta f_{max} \cdot N_f)}, \Delta f_{max} = 480 \cdot 10^3 \text{ Hz}, N_f = 4096,$$

$$K = \frac{T_s}{T_c} = 64, T_s = \frac{1}{(\Delta f_{ref} \cdot N_{f,ref})},$$

$$\Delta f_{ref} = 15 \cdot 10^3 \text{ Hz}, N_{f,ref} = 2048$$

may be defined.

In the 5G or NR system, when the base station transmits control information including a UL scheduling grant, the $K_2$ value corresponding to information for the timing when the UE transmits UL data or the PUSCH may be indicated.

Unless it is instructed to transmit the PUSCH earlier than OFDM symbol $L_2$ by including the timing advance, the UE may transmit it to the base station. In other words, the PUSCH may be transmitted from the UE to the base station simultaneously with or later than the OFDM symbol $L_2$ by including the timing advance. When it is instructed to transmit the PUSCH earlier than OFDM symbol $L_2$ by including the timing advance, the UE may disregard the UL scheduling grant control information from the base station. OFDM symbol $L_2$ may be the first symbol at which the cyclic prefix (CP) of the PUSCH OFDM symbol, which needs to be transmitted $T_{proc,2}$ after the last time of the last OFDM symbol of the PDCCH including the scheduling grant, begins. $T_{proc,2}$ may be calculated as in Equation (4) below.

$$T_{proc,2} = \max\{(N_2 + d_{2,1} + d_{2,2})(2048 + 144) \cdot \kappa 2^{-\mu} \cdot T_C, d_{2,3}\} \quad (4)$$

In the above-mentioned Equation (4), $N_2$, $d_{2,1}$, $d_{2,2}$, $d_{2,3}$, κ, μ, $T_C$ may be defined as follows.

$N_2$ is based on the μ value presented in Table 21 and Table 22 below and matches μ producing the largest $T_{proc,1}$ among $(\mu_{DL}, \mu_{UL})$. That is, $\min(\mu_{DL}, \mu_{UL})$. In the above expression, $\mu_{DL}$ denotes the subcarrier spacing through which PDSCH including DCI for scheduling the PUSCH is transmitted. $\mu_{UL}$ denotes the subcarrier spacing of the UL channel through which the PUSCH is transmitted.

If the first OFDM symbol among PUSCH-allocated OFDM symbols includes only DMRS, $d_{2,1}=0$, otherwise $d_{2,1}=1$.

When HARQ-ACK is multiplexed to the PUSCH scheduled as above, $d_{2,2}=1$, otherwise $d_{2,2}=0$.

When the UE is configured with a plurality of activated component carriers (CCs) or carriers, the maximum timing difference between carriers may be reflected in the second signal transmission.

If DCI indicating BWP switching is scheduled, $d_{2,3}$ means the time required for BWP switching. Otherwise, $d_{2,3}=0$.

$N_2$ is defined as in Table 21 or 22 below according to μ. μ=0, 1, 2, and 3 mean subcarrier spacing is 15 kHz, 30 kHz, 60 kHz, and 120 kHz, respectively. Table 21 shows the PUSCH preparation time (slow processing time) for UE processing capability 1, and Table 21 shows the PUSCH preparation time (fast processing time) for UE processing capability 2.

TABLE 21

| μ | PUSCH preparation time $N_2$ [symbols] |
|---|---|
| 0 | 10 |
| 1 | 12 |

TABLE 21-continued

| μ | PUSCH preparation time $N_2$ [symbols] |
|---|---|
| 2 | 23 |
| 3 | 36 |

TABLE 22

| μ | PUSCH preparation time $N_2$ [symbols] |
|---|---|
| 0 | 3 |
| 1 | 4.5 |
| 2 | 9 for FR1 |

$N_2$ may be used as shown in Table 21 or Table 22 according to UE capability or may be set by a higher layer signal from the base station.

$$T_c = \frac{1}{(\Delta f_{max} \cdot N_f)}, \Delta f_{max} = 480 \cdot 10^3 \text{ Hz}, N_f = 4096,$$

$$K = \frac{T_s}{T_c} = 64, T_s = \frac{1}{(\Delta f_{ref} \cdot N_{f,ref})},$$

$$\Delta f_{ref} = 15 \cdot 10^3 \text{ Hz}, N_{f,ref} = 2048$$

may be defined.

Figure 10:
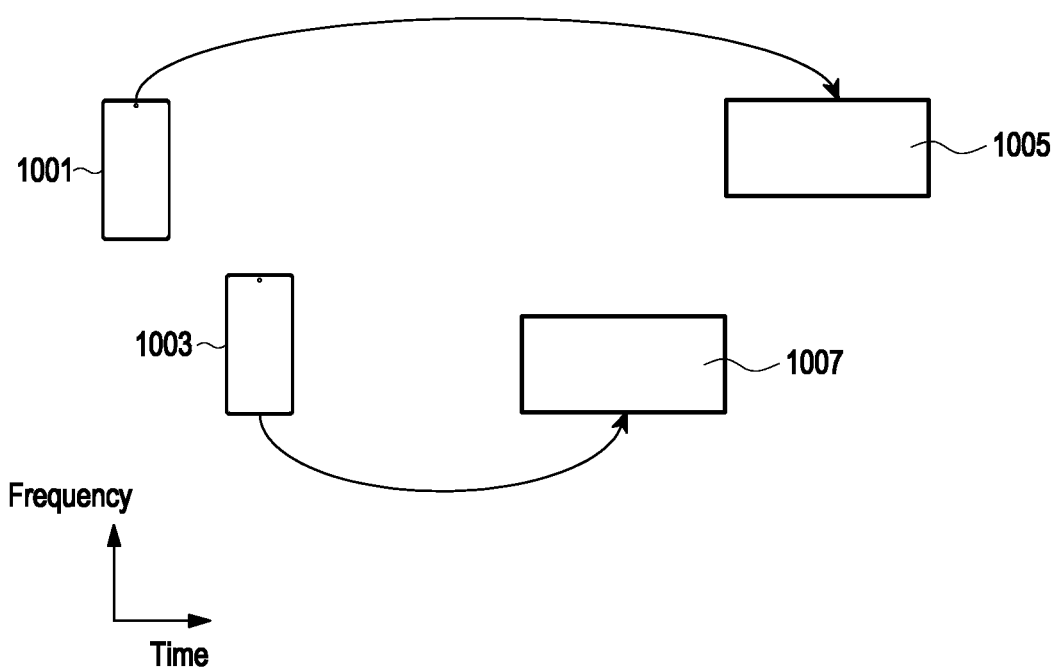
FIG. 10 illustrates a data communication method according to an embodiment.

FIG. 10 illustrates a data communication method according to an embodiment.

Referring to FIG. 10, one UE may receive unicast data and groupcast data as described above in FIG. 5. If the UE supports the above-described fast processing time upon HARQ-ACK reporting for PDSCH reception, the UE may perform HARQ-ACK reporting faster than the UE for which PDSCH supports the above-described slow processing time regardless of unicast data or groupcast data. However, since groupcast data is data received by a plurality of UEs simultaneously, if at least one of the corresponding UEs supports the slow processing time, the base station applies the slow processing time considering the UE supporting the slow processing time. In such a case, the UE has a possibility of applying the slow processing time to groupcast data although the UE supports the fast processing time.

Accordingly, in FIG. 10, if the fast processing time-supporting UE receives groupcast data 1001, the UE applies the slow processing time, rather than the fast processing time, to report first HARQ-ACK information 1005. If the UE receives unicast data 1003, the UE may apply the fast processing time to report second HARQ-ACK information 1007. In this embodiment, although the second HARQ-ACK information 1007 is transmitted from the UE earlier than the first HARQ-ACK information 1005, the unicast data 1003 is received by the UE later than the groupcast data 1001. This is referred to as an out-of-order scheduling scheme. Since the out-of-order scheduling scheme is more complicated than an in-order scheduling scheme in which HARQ-ACK information is first transmitted for data received first in terms of UE implementation complexity, its application may be limited to specific UEs. For example, the out-of-order scheduling scheme may only be applied when the UE may simultaneously receive groupcast data and unicast data.

Alternatively, application of the out-of-order scheduling scheme may be limited to where one of two types of data is unicast data, and the other is groupcast data. For reference, HARQ-ACK information will be transmitted by the UE to the base station through the PUCCH or the PUSCH. Alternatively, in the case of sidelink communication, HARQ-ACK information will be transmitted from the receiving UE to the transmitting UE through the PSFCH. As another example, in a scheduled cell, the UE may receive a first PDSCH in slot i and may transmit an HARQ-ACK thereto in slot j, and the UE may receive a second PDSCH starting after the first PDSCH and transmit HARQ-ACK information therefor in a slot before slot j. The first PDSCH may include a CRC (e.g., G-RNTI) scrambled with an RNTI for groupcast or may be scheduled by DCI therefor, and the second PDSCH may include a CRC (e.g., C-RNTI) scrambled with an RNTI for unicast or may be scheduled by DCI therefor. Alternatively, the HARQ-ACK information for the first PDSCH may be of a type for transmitting only NACK information, and the HARQ-ACK information for the second PDSCH may be of a type for transmitting ACK/NACK information. The type of transmitting only NACK information indicates that the UE reports an NACK value in the corresponding HARQ-ACK resource (the PUCCH or the PUSCH) only when the decoding result of the corresponding PDSCH fails. The type of transmitting ACK/NACK information indicates that the UE maps an ACK in the corresponding HARQ-ACK resource (the PUCCH or the PUSCH) when the decoding result of the corresponding PDSCH succeeds and maps an NACK in the corresponding HARQ-ACK resource (the PUCCH or the PUSCH) when the decoding result of the corresponding PDSCH fails.

In sidelink communication, the UE may receive a first PSSCH in slot i earlier than slot j and may transmit an HARQ-ACK thereto in the slot j, and the UE may receive a second PSSCH starting after the first PSSCH and transmit HARQ-ACK information therefor in a slot before the slot j. The first PSSCH may include a CRC (e.g., G-RNTI) scrambled with an RNTI for groupcast or may be scheduled by SCI therefor, and the second PSSCH may include a CRC (e.g., C-RNTI) scrambled with an RNTI for unicast or may be scheduled by SCI therefor. Alternatively, the HARQ-ACK information for the first PSSCH may be of a type for transmitting only NACK information, and the HARQ-ACK information for the second PSSCH may be of a type for transmitting ACK/NACK information. The type of transmitting only NACK information indicates that the UE reports an NACK value in the corresponding HARQ-ACK resource (PSFCH) only when the decoding result of the corresponding PSSCH fails. The type of transmitting ACK/NACK information indicates that the UE maps an ACK in the corresponding HARQ-ACK resource (PSFCH) when the decoding result of the corresponding PSSCH succeeds and maps an NACK in the corresponding HARQ-ACK resource (PSFCH) when the decoding result of the corresponding PSSCH fails.

Figure 11A:
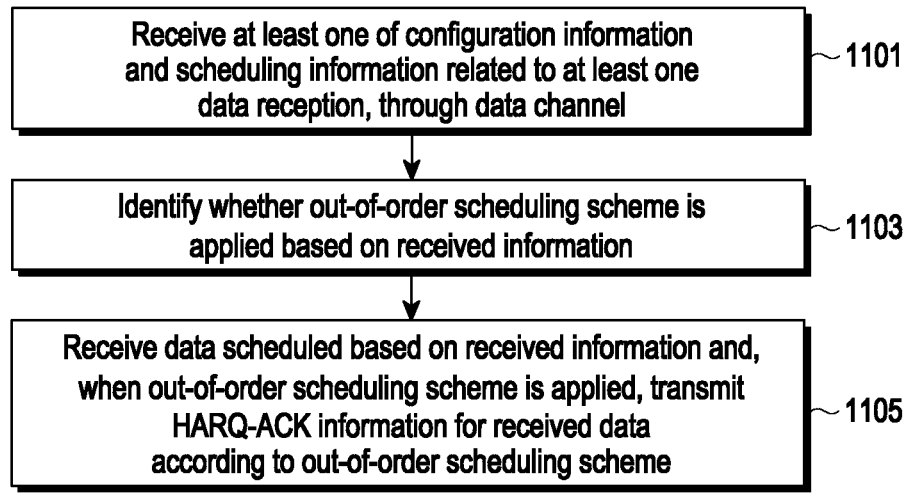
FIG. 11A illustrates a communication method by a UE using an out-of-order scheduling scheme according to an embodiment.

FIG. 11A illustrates a communication method by a UE using an out-of-order scheduling scheme according to an embodiment.

Referring to FIG. 11A, in step 1101, the UE receives at least one of configuration information and scheduling information for receiving various data, such as groupcast data and unicast data carried in a data channel, such as a PDSCH or, in the case of sidelink communication, a PSSCH. The received information may include information for identifying whether the PDSCH carries group cast data or unicast data. The received information may include information for identifying whether the PSSCH carries groupcast data or unicast data.

The received information may include information for identifying whether data carried in PDSCH/PSSCH is data requiring HARQ-ACK information or data not requiring HARQ-ACK information. The received information may include information for identifying whether data carried in the PDSCH/PSSCH is data requiring the fast processing time or data requiring the slow processing time.

Thereafter, in step 1103, the UE determines/identifies whether the out-of-order scheduling scheme is applied based on the received information. In step 1105, the UE may receive data through the data channel based on the received information. When the out-of-order scheduling scheme is applied according to the UE operations described in connection with the embodiment of FIG. 10, the UE may report HARQ-ACK information to a base station (or a counterpart UE in sidelink communication) in the PUCCH/PUSCH (or PSFCH) according to the out-of-order scheduling scheme, in response to the received data.

For example, if the fast processing time-supporting UE receives groupcast data, the UE applies the slow processing time, rather than the fast processing time, to report first HARQ-ACK information and, if the UE receives unicast data, the UE may apply the fast processing time to report second HARQ-ACK information. In this case, even when the groupcast data is received before the unicast data, the second HARQ-ACK information may be transmitted before the first HARQ-ACK information as in the example of FIG. 10. Meanwhile, if the UE does not apply the out-of-order scheduling scheme, the scheduling may be regarded as an error case, and the UE may report valid or invalid HARQ-ACK information. The embodiment of FIG. 11A may be performed in combination with the embodiment of FIG. 9A. In this case, steps 1103 and 1105 may be combined with the embodiment of FIG. 9A.

Figure 11B:
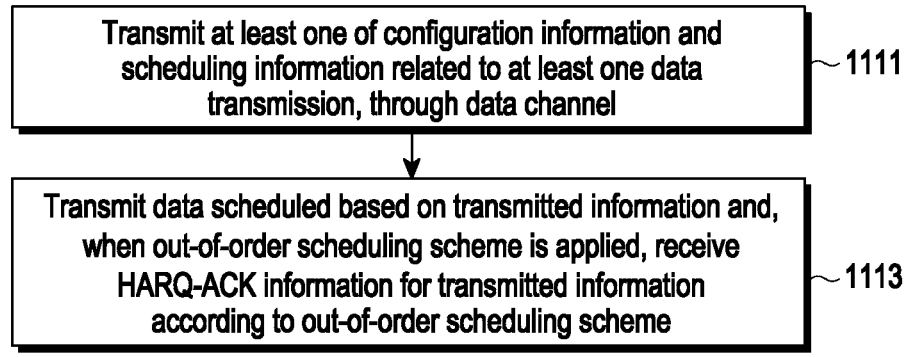
FIG. 11B illustrates a communication method by a base station using an out-of-order scheduling scheme according to an embodiment.

FIG. 11B illustrates a communication method by a base station using an out-of-order scheduling scheme according to an embodiment.

Referring to FIG. 11B, in step 1111, the base station transmits at least one of the above-described configuration information and scheduling information related to reception of at least one type of data carried through a data channel. In step 1113, the base station transmits scheduled data based on the transmitted information and, if the out-of-order scheduling scheme is applied, the base station receives, from the UE, HARQ-ACK information for the transmitted data according to the out-of-order scheduling scheme. The HARQ-ACK feedback may be received through the PUCCH or the PUSCH. When the embodiment of FIG. 11B is applied to sidelink communication, the base station may be a transmitting UE that transmits data through a PSSCH and, in this case, at least part of the configuration information and the scheduling information may be provided from the base station, and HARQ-ACK feedback may be received from the receiving UE receiving the data through PSFCH. The embodiment of FIG. 11B may be performed in combination with the embodiment of FIG. 9B. In this case, step 1113 may be combined with the embodiment of FIG. 9A.

In view of the foregoing, when a plurality of data transmissions are scheduled in a wireless communication system supporting groupcast, HARQ feedback for the received data may be efficiently performed. Further, it is possible to efficiently perform HARQ feedback considering the data processing capability of the UE.

Figure 12:
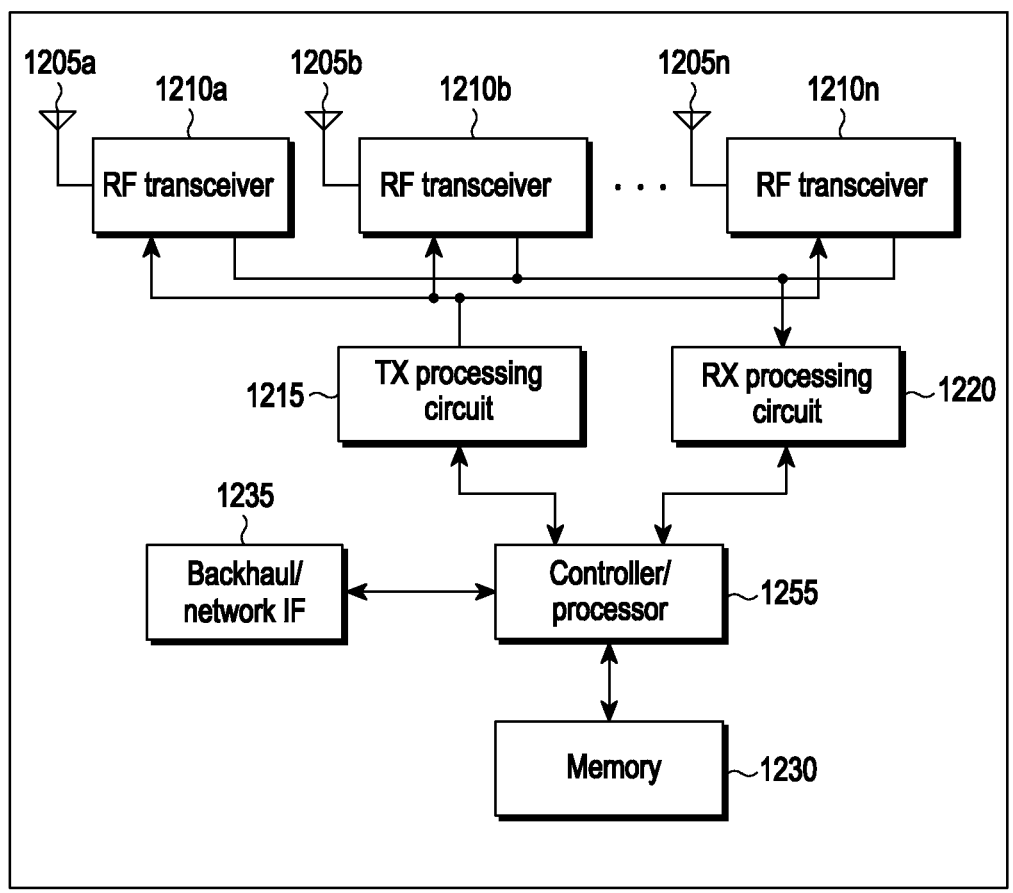
FIG. 12 illustrates a structure of a base station according to an embodiment.

FIG. 12 illustrates a structure of a base station according to an embodiment. The embodiment of FIG. 12 is for illustrative purposes only, and the scope of the disclosure is not limited to the specific implementation shown in FIG. 12.

Referring to FIG. 12, the base station includes a plurality of antennas 1205a to 1205n, a plurality of RF transceivers 1210a to 1210n, a transmit (TX) processing circuit 1215, and a receive (RX) processing circuit 1220. The base station further includes a controller/processor 1225, a memory 1230, and a backhaul or network interface 1235.

The RF transceivers 1210a to 1210n receive input RF signals, such as signals transmitted from UEs in the network, through the antennas 1205a to 1205n. The RF transceivers 1210a to 1210n down-convert the input RF signals, generating intermediate frequency (IF) or baseband signals. The IF or baseband signals are transmitted to the RX processing circuit 1220, and the RX processing circuit 1220 filters, decodes, and/or digitizes the baseband or IF signals, generating processed baseband signals. The RX processing circuit 1220 sends the processed baseband signals to the controller/processor 1225 for further processing.

The TX processing circuit 1215 receives analog or digital data, such as speech data, web data, emails, or interactive video game data, from the controller/processor 1225. The TX processing circuit 1215 encodes, multiplexes, and/or digitizes the output baseband data, generating processed baseband or IF signals. The RF transceivers 1210a to 1210n receive the processed baseband or IF signals output from the TX processing circuit 1215 and up-convert the baseband or IF signals into RF signals which are to be transmitted through the antennas 1205a to 1205n.

The controller/processor 1225 may include one or more processors or other processing devices that control the overall operation of the base station. In one example, the controller/processor 1225 may control reception of forward channel signals and transmission of reverse channel signals by the RF transceivers 1210a to 1210n, the processing circuit 1220, and the TX processing circuit 1215 according to known principles. The controller/processor 1225 may support additional functions, such as more advanced wireless communication functions.

The controller/processor 1225 performs overall operations related to data transmission/reception schemes for groupcast or multicast. In the above-described signal transmission/reception schemes for groupcast or multicast, the controller/processor 1225 transmits at least one of configuration information and scheduling information related to at least one type of data transmission through a data channel to the UE(s) and may control to transmit at least one type of data scheduled for prioritized or simultaneous processing based on the transmitted information, through the data channel. The controller/processor 1225 performs the overall control related to a method for supporting reception of HARQ feedback information from the UE(s) when scheduling data for groupcast and/or unicast to the UE(s).

In the above-described signal transmission/reception schemes for groupcast and/or unicast, when transmitting groupcast data and/or unicast data to the UE(s), the controller/processor 1225 controls the overall operation related to a method as to how to receive HARQ feedback information for the transmitted data.

The controller/processor 1225 may support beamforming or directional routing operations in which signals output from the plurality of antennas 1205a to 1205n are differently weighted to efficiently steer the signals output in a desired direction. Any of other various functions may be supported by the controller/processor 1225 in the base station.

The controller/processor 1225 may also execute programs and other processes, e.g., operating system (OS), resident in the memory 1230. The controller/processor 1225 may move data as required by a running process to the memory 1230 or the outside of the memory 1230.

The controller/processor 1225 is connected with the backhaul or network interface 1235. The backhaul or network interface 1235 allows the base station to communicate with other base stations, other devices or systems over a backhaul connection or over a network. The interface 1235 may support communications over any appropriate wired or wireless connection(s). For example, when the base station is implemented as a part of a cellular communication system (such as a cellular communication system supporting 4G, LTE, or LTE-A), the interface 1235 allows the base station to communicate with other base stations via a wired or wireless backhaul connection. When the base station is implemented as an access point, the interface 1235 allows the base station to communicate with a larger network (e.g., the Internet) via a wired or wireless local area network or a wired or wireless connection. The interface 1235 includes an appropriate structure to support communications through a wired or wireless connection, such as Ethernet or RF transceiver.

The memory 1230 is connected to the controller/processor 1225. A portion of the memory 1230 may include a random access memory (RAM), and another portion of the memory 1230 may include a flash memory or a read-only memory (ROM).

Figure 15:
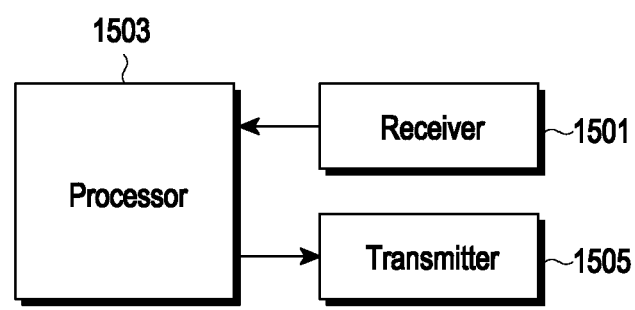
FIG. 15 illustrates a configuration of a base station according to an embodiment.

Although FIG. 12 illustrates a base station, various changes may be made thereto. As an example, the base station may include any number of such components as illustrated in FIG. 12. Alternatively, an access point may include a plurality of interfaces 1235, and the controller/processor 1225 may support routing functions to route data between different network addresses. Although FIG. 15 illustrates that the base station includes a single instance of the TX processing circuit 1215 and a single instance of the RX processing circuit 1220, the base station may include multiple instances (e.g., one for each RF transceiver). Various components of FIG. 12 may be combined together, or each component may be further divided or some components may be omitted or, as necessary, more components may be added.

Figure 13:
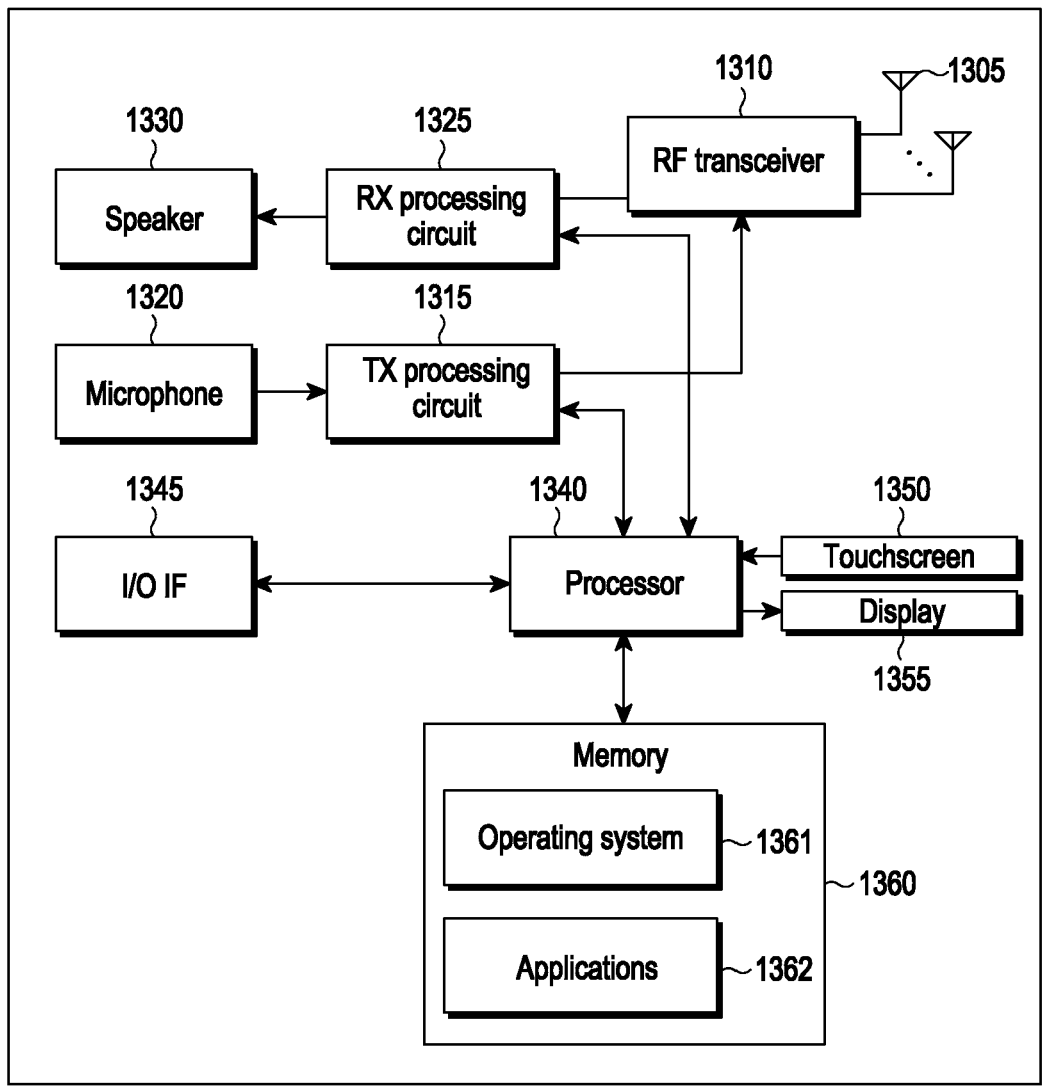
FIG. 13 illustrates a structure of a UE according to an embodiment.

FIG. 13 illustrates a structure of a UE according to an embodiment.

As illustrated in FIG. 13, the UE includes an antenna 1305, an RF transceiver 1310, a transmit (TX) processing circuit 1315, a microphone 1320, and a receive (RX) processing circuit 1325. The UE further includes a speaker 1330, a processor 1340, an input/output (I/O) interface (IF) 1345, a touchscreen 1350, a display 1355, and a memory 1360. The memory 1360 includes an operating system (OS) 1361 and one or more applications 1362.

The RF transceiver 1310 receives an input RF signal transmitted from a base station in a network or transmitted from another UE in sidelink communication, via the antenna 1305. The RF transceiver 1310 down-converts the input RF signal, generating an intermediate frequency (IF) or baseband signal. The IF or baseband signal is transmitted to the RX processing circuit 1325, and the RX processing circuit 1325 filters, decodes, and/or digitizes the baseband or IF signal, generating a processed baseband signal. The RX processing circuit 1325 sends the processed baseband signal to the speaker 1330 (e.g., for speech data) or the processor 1340 (e.g., for web browsing data) for further processing.

The TX processing circuit 1315 receives analog or digital speech data from the microphone 1320 or other output baseband data (e.g., web data, emails, or interactive video game data) from the processor 1340. The TX processing circuit 1315 encodes, multiplexes, and/or digitizes the output baseband data, generating a processed baseband or IF signal. The RF transceiver 1310 receives the processed baseband or IF signal output from the TX processing circuit 1315 and up-converts the baseband or IF signal into an RF signal which is to be transmitted through the antenna 1305.

The processor 1340 may include one or more processors or other processing devices and may execute the OS 1361 stored in the memory 1360 to control the overall operation of the UE. As an example, the processor 1340 may control reception of DL channel signals and transmission of UL channel signals, or transmission/reception of the control channel and data channel in sidelink communication, by the RF transceiver 1310, the RF processing circuit 1325, and the TX processing circuit 1315 according to known principles. According to some embodiments, the processor 1340 includes at least one microprocessor or microcontroller.

The processor 1340 performs overall operations related to data transmission/reception schemes for groupcast or multicast. In the above-described signal transmission/reception schemes for groupcast or multicast, the processor 1340 receives at least one of configuration information and scheduling information related to at least one data reception through a data channel and may control to receive at least one data scheduled for prioritized or simultaneous processing based on the received information, through the data channel. When receiving data for groupcast and/or unicast, the processor 1340 controls the overall operation related to a method for supporting transmission of HARQ feedback information to the base station or to another transmitting UE in sidelink communication.

In the above-described signal transmission/reception schemes for groupcast and/or unicast, in the case of receiving groupcast data and/or unicast data, the processor 1340 controls the overall operation related to a method as to how to transmit HARQ feedback information for the transmitted data.

The processor 1340 may execute other processes and programs embedded in the memory 1360, such as processes for CSI feedback on the UL channel. The processor 1340 may move data into or out of the memory 1360 as required by a running process. The processor 1340 is configured to execute the applications 1362 based on the OS program 1361 or in response to signals received from base stations or the operator. The processor 1340 is coupled to the I/O interface 1345, and the I/O interface 1345 provides the UE with connectibility to other devices, e.g., laptop computers and handheld computers. The I/O interface 1345 is a communication path between these accessories and the processor 1340.

The processor 1340 is also connected to the touchscreen 1350 and the display unit 1355. The operator of the UE may input data into the UE using the touchscreen 1350. The display 1355 may be a liquid crystal display, a light emitting diode display, or other displays capable of rendering text and/or at least limited graphics, such as from websites.

The memory 1360 is connected to the processor 1340. A portion of the memory 1360 may include a random access memory (RAM), and the remainder of the memory 1360 may include a flash memory or a read-only memory (ROM).

Although FIG. 13 illustrates a UE, various changes may be made thereto. For example, various components of FIG. 13 may be combined together, each component may be further divided, or some components may be omitted, or other components may be added as necessary. As an example, the processor 1340 may be divided into multiple processors, such as one or more CPUs and one or more graphics processing units (GPUs). Although the UE is configured like a mobile phone or a smart phone in FIG. 13, the UE may be configured to operate as a different type of mobile or stationary device.

Each of the UE and the base station for carrying out the embodiments may include a transmitter, a receiver, and a processor.

The receiver, processor, and transmitter of each of the base station and the UE may be operated according to each embodiment described above, to transmit groupcast control information and unicast control information, groupcast data, and unicast data. The control information may include at least one of configuration information and scheduling information described above in connection with the above embodiments.

Figure 14:
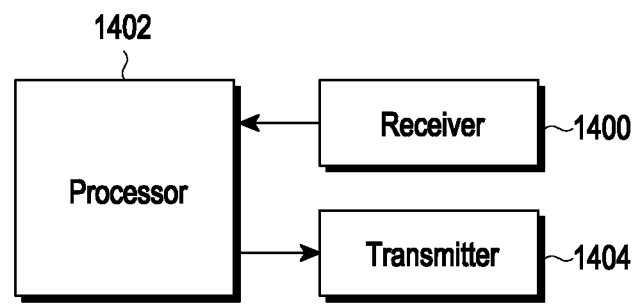
FIG. 14 illustrates a configuration of a UE according to an embodiment.

FIG. 14 illustrates a structure of a UE according to an embodiment.

The UE may include a receiver 1400, a transmitter 1404, and a processor 1402. The receiver 1400 and the transmitter 1404 may collectively be referred to as a transceiver. The transceiver may transmit/receive signals to/from the base station or another UE in sidelink communication. The signals may include at least one of control information and data. To that end, the transceiver may include an RF transmitter for frequency-up converting and amplifying transmitted signals and an RF receiver for low-noise amplifying and frequency-down converting received signals.

In FIG. 14, the processor 1402 may control the operation of the UE according to each of the above-described embodiments or a combination of at least one of the embodiments. For example, the processor 1402 may control the operations of receiving at least one of configuration information and scheduling information related to reception of at least one data through a data channel, identifying data to be processed first or simultaneously in relation to decoding and whether resource regions for multiple scheduled data overlap based on the received information, receiving the identified data to be processed first or simultaneously through a data channel, and perform decoding. The processor 1402 may control the operations of identifying whether to apply an out-of-order scheduling scheme based on the received information, receiving data scheduled based on the received information and, when the out-of-order scheduling scheme is applied, transmitting HARQ-ACK information for the received data according to the out-of-order scheduling scheme.

If the UE is a transmitting UE in sidelink communication, the processor 1340 may control the operations of transmitting, to the receiving UE, at least one of configuration information and scheduling information related to at least one data transmission through a data channel and transmitting, through the data channel, at least one data scheduled for prioritized or simultaneous processing based on the transmitted information.

FIG. 15 illustrates a structure of a base station according to an embodiment.

Referring to FIG. 15, the base station may include a receiver 1501, a transmitter 1505, and a processor 1503. The receiver 1501 and the transmitter 1505 may collectively be referred to as a transceiver. The transceiver may transmit/receive signals to/from the UE. The signals may include at least one of control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 1503, and transmit signals output from the processor 1503 via a radio channel.

The processor 1503 may control a series of processes for the base station to be able to operate according to each or, a combination of at least one of, the above-described embodiments. For example, the processor 1503 may control the operations of transmitting at least one of configuration information and scheduling information related to at least one data transmission through a data channel and transmitting, through the data channel, at least one data scheduled for prioritized or simultaneous processing based on the transmitted information. The processor 1503 may control the operations of transmitting data scheduled based on the transmitted information and, if the out-of-order scheduling scheme is applied, receiving HARQ-ACK information for the transmitted data according to the out-of-order scheduling scheme.

It should be appreciated that the blocks in each flowchart and combinations of the flowcharts herein may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart.

Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). It should also be noted that in some replacement execution examples, the functions mentioned in the blocks may occur in different orders. For example, two blocks that are consecutively shown may be performed substantially simultaneously or in a reverse order depending on corresponding functions.

The embodiments herein are provided merely for better understanding of the disclosure, and the disclosure should not be limited by the embodiments. In other words, it is apparent to one of ordinary skill in the art that various changes may be made thereto without departing from the scope of the disclosure. The embodiments may be practiced in combination. For example, embodiments may be combined and applied. The embodiments described herein may be changed or modified based on their technical spirit and applied to LTE systems or 5G systems.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) in a wireless communication system, the method comprising:
receiving, from a base station, downlink control information (DCI) on a physical downlink control channel (PDCCH), the DCI scheduling downlink data for the UE;
receiving the downlink data on a physical downlink shared channel (PDSCH) based on the received DCI; and
transmitting, to the base station, hybrid automatic repeat request acknowledgement (HARQ-ACK) information in response to the reception of the downlink data,
wherein the transmission of the HARQ-ACK information is associated with a first PDSCH processing capability or a second PDSCH processing capability,
wherein the first PDSCH processing capability has a PDSCH processing time slower than a PDSCH processing time of the second PDSCH processing capability, and
wherein the first PDSCH processing capability is applied to the PDSCH scheduled by the PDCCH with the DCI in case that the downlink data is multicast data.

2. The method of claim 1,
wherein the DCI includes a cyclic redundancy check (CRC) scrambled by a group-radio network temporary identifier (G-RNTI) in case that the downlink data is the multicast data.

3. The method of claim 1, further comprising receiving configuration information used to identify the first and second PDSCH processing capabilities from the base station.

4. The method of claim 1,
wherein the PDSCH processing capability represents a processing time until starting transmission of the HARQ-ACK information after a last symbol where the UE receives the downlink data on the PDSCH.

5. A user equipment (UE) in a wireless communication system, the UE comprising:
a transceiver; and
a processor configured to:
receive, via the transceiver from a base station, downlink control information (DCI) on a physical downlink control channel (PDCCH), the DCI scheduling downlink data for the UE,
receive, via the transceiver, the downlink data on a physical downlink shared channel (PDSCH) based on the received DCI, and
transmit, to the base station, via the transceiver, hybrid automatic repeat request acknowledgement (HARQ-ACK) information in response to the reception of the downlink data,
wherein the transmission of the HARQ-ACK information is associated with a first PDSCH processing capability or a second PDSCH processing capability,
wherein the first PDSCH processing capability has a PDSCH processing time slower than a PDSCH processing time of the second PDSCH processing capability, and
wherein the first PDSCH processing capability is applied to the PDSCH scheduled by the PDCCH with the DCI in case that the downlink data is multicast data.

6. The UE of claim 5,
wherein the DCI includes a cyclic redundancy check (CRC) scrambled by a group-radio network temporary identifier (G-RNTI) in case that the downlink data is the multicast data.

7. The UE of claim 5,
wherein the processor is further configured to receive, via the transceiver, configuration information used to identify the first and second PDSCH processing capabilities from the base station.

8. The UE of claim 5,
wherein the PDSCH processing capability represent a processing time until starting transmission of the HARQ-ACK information after a last symbol where the UE receives the downlink data on the PDSCH.

9. A method performed by a base station in a wireless communication system, the method comprising:
transmitting, to a user equipment (UE), downlink control information (DCI) on a physical downlink control channel (PDCCH), the DCI scheduling downlink data for the UE;
transmitting the downlink data on a physical downlink shared channel (PDSCH) based on the transmitted DCI; and
receiving, from the UE, hybrid automatic repeat request acknowledgement (HARQ-ACK) information in response to the transmission of the downlink data,
wherein the reception of the HARQ-ACK information is associated with a first PDSCH processing capability or a second PDSCH processing capability,
wherein the first PDSCH processing capability has a PDSCH processing time slower than a PDSCH processing time of the second PDSCH processing capability, and
wherein the first PDSCH processing capability is applied to the PDSCH scheduled by the PDCCH with the DCI in case that the downlink data is multicast data.

10. The method of claim 9,
wherein the DCI includes a cyclic redundancy check (CRC) scrambled by a group-radio network temporary identifier (G-RNTI) in case that the downlink data is the multicast data.

11. The method of claim 9, further comprising transmitting configuration information used to identify the first and second PDSCH processing capabilities to the UE.

12. The method of claim 9,
wherein the PDSCH processing capability represent a processing time until starting transmission of the HARQ-ACK information after a last symbol where the UE receives the downlink data on the PDSCH.

13. A base station in a wireless communication system, the base station comprising:
a transceiver; and
a processor configured to:
transmit, to a user equipment (UE), downlink control information (DCI) on a physical downlink control channel (PDCCH), the DCI scheduling downlink data for the UE,
transmit the downlink data on a physical downlink shared channel (PDSCH) based on the transmitted DCI, and
receive, from the UE, hybrid automatic repeat request acknowledgement (HARQ-ACK) information in response to the transmission of the downlink data,
wherein the reception of the HARQ-ACK information is associated with a first PDSCH processing capability or a second PDSCH processing capability,
wherein the first PDSCH processing capability has a PDSCH processing time slower than a PDSCH processing time of the second PDSCH processing capability, and wherein the first PDSCH processing capability is applied to the PDSCH scheduled by the PDCCH with the DCI in case that the downlink data is multicast data.

14. The base station of claim 13, wherein the DCI includes a cyclic redundancy check (CRC) scrambled by a group-radio network temporary identifier (G-RNTI) in case that the downlink data is the multicast data.

15. The base station of claim 13, wherein the processor is further configured to transmit, via the transceiver, configuration information used to identify the first and second PDSCH processing capabilities to the UE.

16. The base station of claim 13, wherein the PDSCH processing capability represents a processing time until starting transmission of the HARQ-ACK information after a last symbol where the UE receives the downlink data on the PDSCH.

* * * * *